(12) United States Patent
Chapman et al.

(10) Patent No.: US 11,904,542 B2
(45) Date of Patent: Feb. 20, 2024

(54) PLATEN WITH GRID ASSEMBLY FOR 3D PRINTING

(71) Applicant: Stratasys, Inc., Eden Prairie, MN (US)

(72) Inventors: Jeff Lee Chapman, New Prague, MN (US); Robert Skubic, Chanhassen, MN (US); Bryan Migliori, Lakeville, MN (US); Benjamin L Braton, Otsego, MN (US); Patrick W. Anderson, Saint Louis Park, MN (US); Josh Durand, Shakopee, MN (US); Colin Schiel, Chaska, MN (US)

(73) Assignee: Stratasys, Inc., Eden Prairie, MN (US)

( * ) Notice: Subject to any disclaimer, the term of this patent is extended or adjusted under 35 U.S.C. 154(b) by 367 days.

(21) Appl. No.: 17/112,534

(22) Filed: Dec. 4, 2020

(65) Prior Publication Data
US 2022/0001613 A1 Jan. 6, 2022

Related U.S. Application Data

(60) Provisional application No. 63/047,061, filed on Jul. 1, 2020.

(51) Int. Cl.
| | |
|---|---|
| *B29C 64/245* | (2017.01) |
| *B29C 64/232* | (2017.01) |
| *B33Y 30/00* | (2015.01) |
| *B29C 64/118* | (2017.01) |

(52) U.S. Cl.
CPC .......... *B29C 64/245* (2017.08); *B29C 64/118* (2017.08); *B29C 64/232* (2017.08); *B33Y 30/00* (2014.12)

(58) Field of Classification Search
CPC ... B29C 64/245; B29C 64/118; B29C 64/232; B33Y 30/00
See application file for complete search history.

(56) References Cited

U.S. PATENT DOCUMENTS

| | | | |
|---|---|---|---|
| 5,503,785 | A | 4/1996 | Crump et al. |
| 5,939,008 | A | 8/1999 | Comb et al. |
| 6,547,995 | B1 | 4/2003 | Comb |
| 6,722,872 | B1 | 4/2004 | Swanson et al. |
| 7,063,285 | B1 | 6/2006 | Turley et al. |
| 7,604,470 | B2 | 10/2009 | LaBossiere et al. |
| 7,938,356 | B2 | 5/2011 | Taatjes et al. |

(Continued)

*Primary Examiner* — Joseph S Del Sole
*Assistant Examiner* — Baileigh Kate Darnell
(74) *Attorney, Agent, or Firm* — Peter J. Ims; Westman, Champlin & Koehler, P.A.

(57) ABSTRACT

A platen assembly for use with an extrusion-based 3D printer includes a grid assembly comprising at least a 4×2 framework of interlocked perpendicular x direction beams and y direction beams, providing a substantially planar upper surface and a bottom surface. The platen assembly includes a platen comprising a thin metal sheet supported on the upper surface of the grid assembly and secured to the grid assembly such that the top surface provides a substantially flat build surface. The x direction beams, the y direction beams and the platen are constructed of substantially a same thermal expansion properties, and wherein the build surface of the platen has a build surface area of at least 400 square inches and maintains its flatness to within a flatness tolerance of 0.020 inches over a temperature range of at least 20 C-300 C.

18 Claims, 17 Drawing Sheets

(56) References Cited

U.S. PATENT DOCUMENTS

| | | |
|---|---|---|
| 8,419,996 B2 | 4/2013 | Swanson et al. |
| 8,647,102 B2 | 2/2014 | Swanson et al. |
| 8,926,882 B2 | 1/2015 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |
| 10,471,658 B2 | 11/2019 | Swanson |
| 2005/0173588 A1* | 8/2005 | Bredy ............... F42B 10/48 244/3.24 |
| 2010/0100222 A1* | 4/2010 | Skubic ............ B29C 64/245 700/110 |
| 2018/0043627 A1 | 2/2018 | Barclay et al. |
| 2019/0210284 A1 | 7/2019 | Bosveld |
| 2019/0240904 A1 | 8/2019 | Swanson et al. |

\* cited by examiner

PLATEN WITH GRID ASSEMBLY FOR 3D PRINTING

CROSS-REFERENCE TO RELATED APPLICATION

The present application is based on and claims the benefit of U.S. provisional patent application Ser. No. 63/047,061, filed Jul. 1, 2020, the content of which is hereby incorporated by reference in its entirety.

BACKGROUND

The present disclosure relates to additive manufacturing systems for printing or otherwise building 3D parts by material extrusion techniques. In particular, the present disclosure relates to build platens for use in extrusion-based 3D printers.

Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream through the nozzle tip. The extruded material is deposited in a continuous flow in toolpaths according to digital data based on the digital representation of a part to be printed. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

Build platens and substrates are used in additive process modeling techniques to stabilize a 3D printed part as it is built and allow removal of the part when it is complete. Typically, it is preferred that a part or model under construction be strongly adhered to a releasable modeling substrate which is in turn adhered to a flat build platen, and that the modeling substrate is constrained to the platen during part build but is easily removable after the part is built. The larger a part under construction, the more internal stress and or strain it will experience during a build, especially when printing at high temperatures. Stresses and strains generated within the modeling material tend to warp the printed structures unless the structures are supported in their correct orientation. Adherence of the part to a substantially flat build surface can minimize or eliminate part warpage as the part is constructed and experiences thermal gradients, to achieve part accuracy. However, there is a continuing need for large format build platens that will maintaining flatness in high temperature build environments.

SUMMARY

An aspect of the present disclosure relates to a platen assembly for use with an extrusion-based 3D printer. The platen assembly includes a grid assembly comprising at least a 4×2 framework of interlocked perpendicular x direction beams and y direction beams, providing a substantially planar upper surface and a bottom surface. The platen assembly includes a platen comprising a thin metal sheet supported on the upper surface of the grid assembly and secured to the grid assembly such that the top surface provides a substantially flat build surface. The x direction beams, the y direction beams and the platen are constructed of substantially a same material having substantially a same thermal expansion properties, and wherein the build surface of the platen has a build surface area of at least 400 square inches and maintains its flatness to within a flatness tolerance of 0.020 inches over a temperature range of at least 20 C-150 C.

Another aspect of the present disclosure relates an extrusion based 3D printer. The 3D printer includes a heated build chamber comprising opposing side walls, each opposing side wall having a plurality of spaced apart slots and a platen assembly within the chamber. The platen assembly includes a grid assembly comprising at least a 4×2 framework of interlocked perpendicular x direction beams and y direction beams, providing a substantially planar upper surface and a bottom surface and a platen comprising a thin metal sheet supported on the upper surface of the grid assembly and secured to the grid assembly such that the top surface provides a substantially flat build surface. The x direction beams, the y direction beams and the platen are constructed of substantially a same material having substantially a same thermal expansion properties, and wherein the build surface of the platen has a build surface area of at least 400 square inches and maintains its flatness to within a flatness tolerance of 0.020 inches over a temperature range of at least 20 C-150 C.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The term "substantially flat surface" is used to describe a surface that can include machined indentions, such as grooves for a vacuum system and/or apertures for securing a platen having the substantially planar surface to other components of the platen.

The term "grid assembly" includes an internal, interconnected grid system with or without an exterior frame. The exterior frame can partially or completely cover and engage ends of the internal grid system. The members of the exterior frame can have the same construction as the internal grid system or can be of a different construction relative to the internal grid system. The grid assembly has a construction of at least 4×2 when including the exterior frame.

The terms "additive manufacturing system" and "3D printer" refer to a system that prints, builds, or otherwise produces parts, prototypes, or other 3D items and/or support structures at least in part using an additive manufacturing technique. The additive manufacturing system may be a stand-alone 3D printer, a robotic system, a sub-unit of a larger system or production line, and/or may include other non-additive manufacturing features, such as subtractive-manufacturing features, pick-and-place features, two-dimensional printing features, and the like.

DETAILED DESCRIPTION

The present disclosure is directed to a platen assembly for use in a 3D printer or additive manufacturing system. The platen assembly includes a thin metal platen secure to a framework of interconnected beams in a grid assembly, where the weight of the grid framework platen assembly is reduced relative to a typical platen of similar size having a solid metal construction, while maintaining a substantially flat or substantially planar upper build surface. The disclosed platen assembly is particularly suitable in a large format for use in a large format printer having a heated build chamber, as it provides a platen surface that remains substantially flat over a large range of temperatures, while its grid assembly construction reduces platen weight and heating time, and its lighter weight reduces power requirements of motors and actuators used to incrementally move the plate as a part is built, relative to a typical large-format platen. Larger format platens include but are not limited to 24 in. by 24 in. platens (576 sq. in.) and 32 in. by 40 in. platens (1,280 sq. in.). What is meant by a light weight metal platen is a metal platen weighing at least 50 percent less than a block metal platen of the same or similar metal.

A typical platen in a fused deposition modeling 3D printer, such as a Fortus® F900® printer sold by Stratasys, Inc., Eden Prairie, Minn., includes a block of metal that is precisely machined to provide a flat or substantially planar surface, onto which 3D parts can be printed. The precisely flat, non-warping block of machined metal is expensive to manufacture and it is quite heavy, so it requires more robust z stage actuation and movement control. In addition, in a thermally controlled build chamber, a thick slab of metal material requires much longer heating times relative to the disclosed platen assembly because of its substantial mass, and thus, the heated build chamber takes longer to reach a temperature set point.

Figure 1:
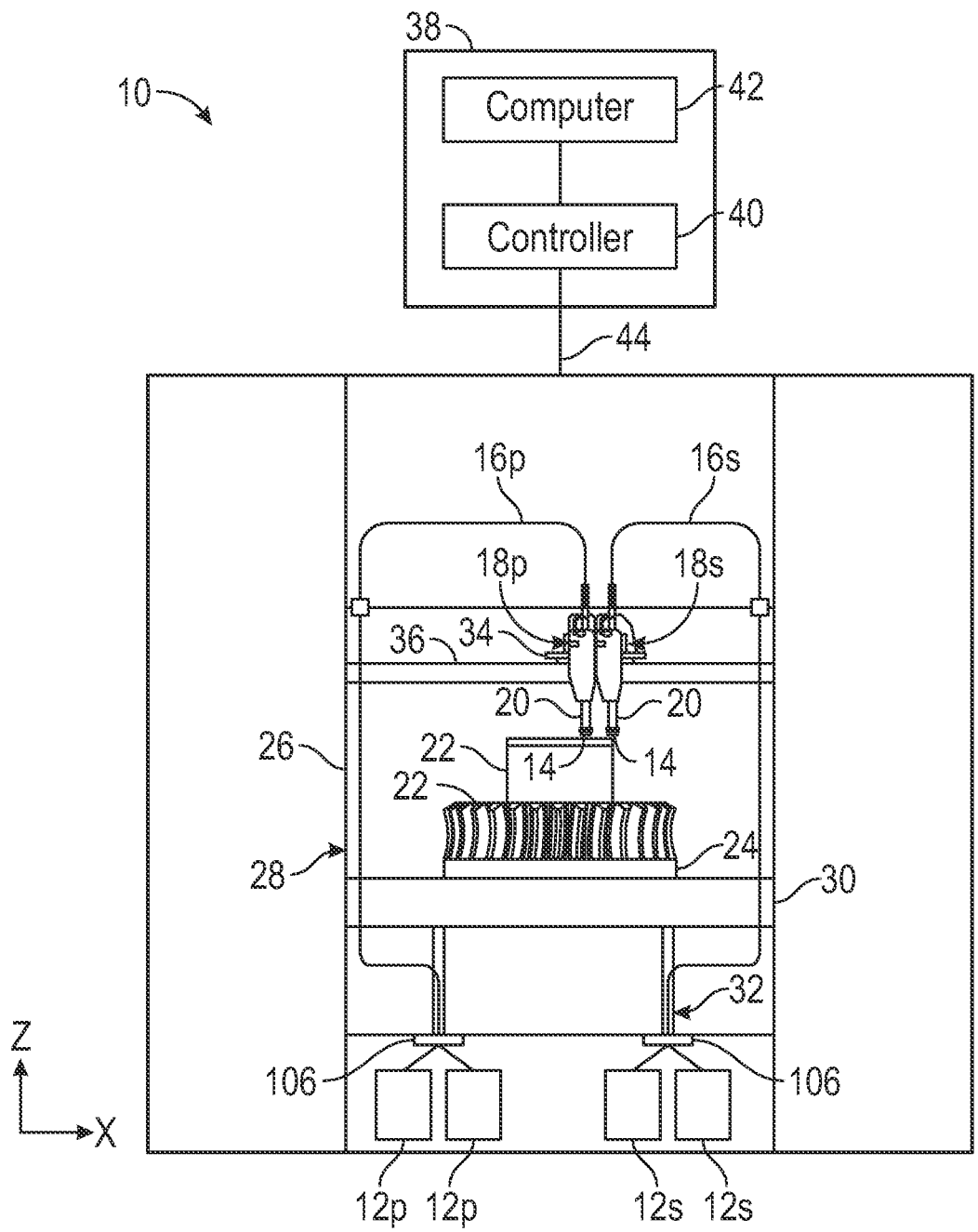
FIG. 1 is a front schematic view of an extrusion-based 3D printer.

The present disclosure may be used with any suitable extrusion-based 3D printer. For example, FIG. 1 illustrates a schematic view of an exemplary 3D printer 10 that has a substantially horizontal print plane, and where the part is printed and indexed in a substantially vertical direction. Parts are printed in a layer by layer manner using two print heads 18$p$ for part material and 18$s$ for support material or printed with part material alone. The illustrated 3D printer 10 uses four consumable assemblies, two consumable assemblies 12$p$ for part material and two consumable assemblies 12$s$ for support material. Each consumable assembly 12$p$ and 12$s$ is a removable, and replaceable supply device such that dual supplies of consumable filament of part material and dual supplies of consumable material for support material can be retained and utilized in a single 3D printer 10. All of the consumable assemblies 12$p$ and 12$s$ may be identical or different in composition. Each consumable assembly 12 may retain the consumable filament on a wound spool, a spool-less coil, or other supply arrangement, such as discussed for example in Turley et al. U.S. Pat. No. 7,063,285; Taatjes at al., U.S. Pat. No. 7,938,356; and Mannella et al., U.S. Pat. Nos. 8,985,497 and 9,073,263. While four assemblies are illustrated, the present disclosure is not limited to a 3D printer with four assemblies. Rather, the 3D printer of the present disclosure can utilize any number of assemblies including two or more assemblies containing the same or different consumable materials.

Figure 2:
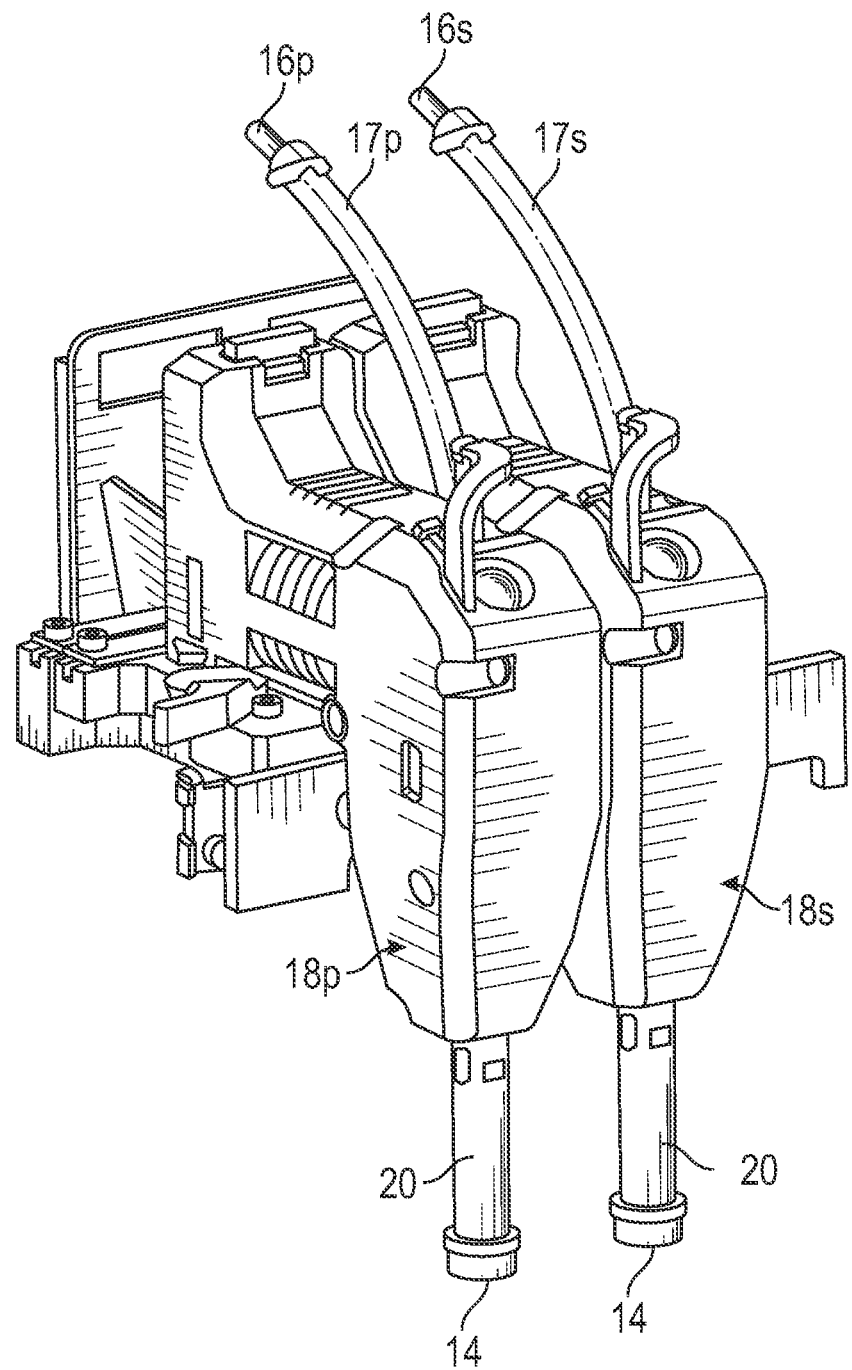
FIG. 2 is a view of a pair of print heads on a head carriage.

As shown in FIG. 2, each print head 18$p$ and 18$s$ is a device comprising a housing that retains a liquefier 20 having a nozzle tip 14. A filament feed path 16$p$ and 16$s$ interconnects each consumable assembly 12$p$ and 12$s$ and print head 18$p$ and 18$s$, and provides a filament feed path from the filament supply to the print head, where the filament feed paths 16$p$ and 16$s$ are substantially sealed from ambient conditions. Upper ends of feed path 16$p$ and 16$s$ can be attached to the print heads 18$p$ and 18$s$ using end piece 17$p$ and 17. In the illustrated embodiment, the end piece 17$p$ and 17$s$ is sufficiently rigid to retain an arcuate configuration of the feed path 16$p$ and 16$s$ with a radius that prevents the filament from being bent too sharply which can cause the filament to break or crease, resulting in the filament being misfed to the print head 18$p$ and 18$s$.

Exemplary 3D printer 10 prints parts or models and corresponding support structures (e.g., 3D part 22 and support structure 24) from the part and support material filaments, respectively, of consumable assemblies 12, by extruding roads of molten material along toolpaths. During a build operation, successive segments of consumable filament are driven into print head 18 where they are heated and melt in liquefier 20. The melted material is extruded through nozzle tip 14 in a layer-wise pattern to produce printed parts. Suitable 3D printers 10 include fused deposition modeling systems developed by Stratasys, Inc., Eden Prairie, Minn. under the trademark "FDM".

As shown, the 3D printer 10 includes system cabinet or frame 26, chamber 28, platen 30, platen gantry 32, head carriage 34, and head gantry 36. Cabinet 26 may include container bays configured to receive consumable assemblies 12$p$ and 12$s$. In alternative embodiments, the container bays may be omitted to reduce the overall footprint of 3D printer 10. In these embodiments, consumable assembly 12 may stand proximate to printer 10.

Chamber 28 contains platen 30 for printing 3D part 22 and support structure 24. Chamber 28 may be an enclosed environment and may be heated (e.g., with circulating heated air) to reduce the rate at which the part and support materials solidify after being extruded and deposited (e.g., to reduce distortion and curling). A typical chamber includes a thermal insulator that allows the print heads 18$p$ and 18$s$ to be located outside the heated space, while moving in a heated build envelope, and printing in a plane, whether x-y, x-z or y-z depending upon the configuration of the printer. In some embodiments, the thermal insulator includes insulators wherein baffles on either side of the print heads move in concert with them, to maintain the heated thermal space, such as disclosed in Swanson U.S. Pat. No. 6,722,872. Bosveld U.S. Patent Application Publication 2019/0210284 discloses pleated insulators that are removably attached to the central portion. In other embodiments, the print head moves within the central portion and the left and right thermal insulators attached to the central portion maintain their length as the insulators move, such as disclosed in Swanson U.S. Patent Application Publication 2019/0240904.

Figure 2A:
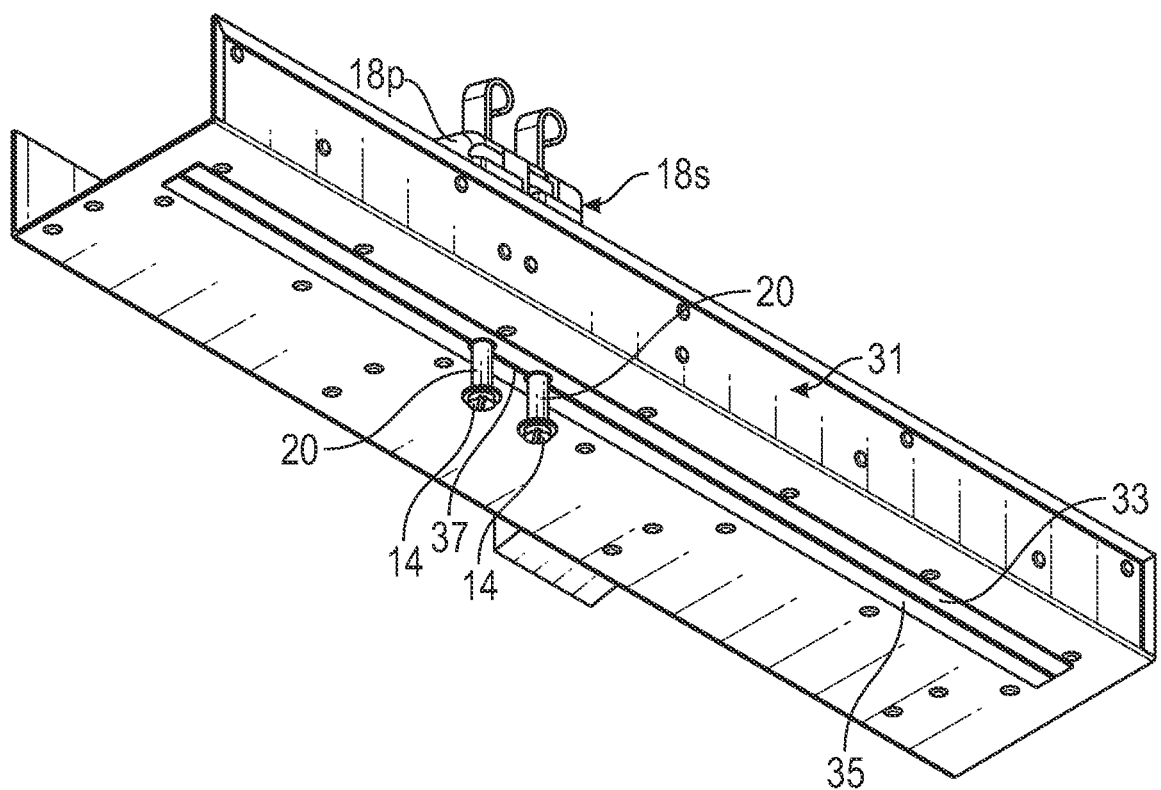
FIG. 2A is a view of a central portion of a thermal insulator for a heated chamber of the extrusion-based 3D printer.

Referring to FIG. 2A, a central portion 31 of a thermal insulator includes the portion of the gantry which holds the 3D print heads such that the print head tip portion 20 projects through the baffle, into the heated thermal chamber, such as disclosed in Swanson U.S. Pat. No. 6,722,872, Bosveld U.S. Patent Application Publication 2019/0210284 and Swanson U.S. Patent Application Publication 2019/0240904. The deformable central portion 31 includes flaps 33 and 35 attached to the central portion 31 along three edges, where edges within the central portion 31 are free and form a slightly overlapping slit 37. Portions of the liquefiers 20 and the nozzle tips 14 of the print heads 18$p$ and 18$s$ extend through the slit 37, where the flaps 33 and 35 provide a thermal barrier to prevent the print heads 18$p$ and 18$s$ from creating a potentially large hot air leakage areas within the chamber 28, while allow the print heads 18$p$ and 18$s$ to move freely along a length of the central portion 31. Maintaining the print heads 18$p$ and 18$s$ outside the heated chamber at lower temperatures aids in extending the life of their electrical components. The baffle flaps are constructed of flexible thermally tolerant fabric material, such as but not limited to polytetrafluoroethylene (PTFE) coated fiberglass, which can tolerate elevated thermal chamber temperature conditions while still maintaining closure of the print head movement path.

In alternative embodiments, chamber 28 may be omitted and/or replaced with different types of build environments. For example, 3D part 22 and support structure 24 may be printed in a build environment that is open to ambient conditions or may be enclosed with alternative structures (e.g., flexible curtains).

Platen assembly 30 is a platform on which 3D part 22 and support structure 24 are printed in a layer-by-layer manner and is supported by platen gantry 32. In some embodiments, platen assembly 30 may engage and support a build substrate, which may be a tray substrate fabricated from plastic, corrugated cardboard, or other suitable material, and may also include a flexible plastic sheet, polymeric film or liner, painter's tape, polyimide tape, a magnetic sheet, or other disposable fabrication for adhering deposited material onto the platen assembly 30 or onto the build substrate. Platen gantry 32 is a gantry assembly configured to move platen assembly 30 along (or substantially along) the vertical z-axis.

Head carriage 34 is a unit configured to receive and retain print heads 18p and 18s and is supported by head gantry 36. In the shown embodiment, head gantry 36 is a mechanism configured to move head carriage 34 (and the retained print heads 18p and 18s) in (or substantially in) a horizontal x-y plane above platen assembly 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen assembly 30 may be configured to move in the horizontal x-y plane within chamber 28, and head carriage 34 (and print heads 18p and 18s) may be configured to move along the z-axis. Other similar arrangements may also be used such that one or both of platen assembly 30 and print heads 18p and 18s are moveable relative to each other. Platen assembly 30 and head carriage 34 (and print heads 18) may also be oriented along different axes. For example, platen assembly 30 may be oriented vertically and print heads 18p and 18s may print 3D part 22 and support structure 24 along the x-axis or the y-axis.

FIG. 2 illustrates an example embodiment of two print heads 18p and 18s which include the print head drives which supply filament. The shown print heads 18p and 18s are similarly configured to receive a consumable filament, melt the filament in liquefier 20 to product a molten material, and deposit the molten material from a nozzle tip 14 of liquefier 20. The print head 18 can have any suitable configuration. In addition to the dual-tip embodiment as illustrated, examples of suitable devices for print head 18, and the connections between print head 18 and head gantry 36 include those disclosed in Crump et al., U.S. Pat. No. 5,503,785; LaBossiere, et al., U.S. Pat. No. 7,604,470; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more filament drive mechanisms are directed to intermittently and successively feed segments of the modeling and support materials (e.g., consumable filaments via feed paths or guide tubes 16) to print head 18 from consumable assemblies 12.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, filament drive mechanisms, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen assembly 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively advance successive segments of the consumable filaments from consumable assembly 12 through guide tubes 16 and into the liquefier 20.

Figure 3:
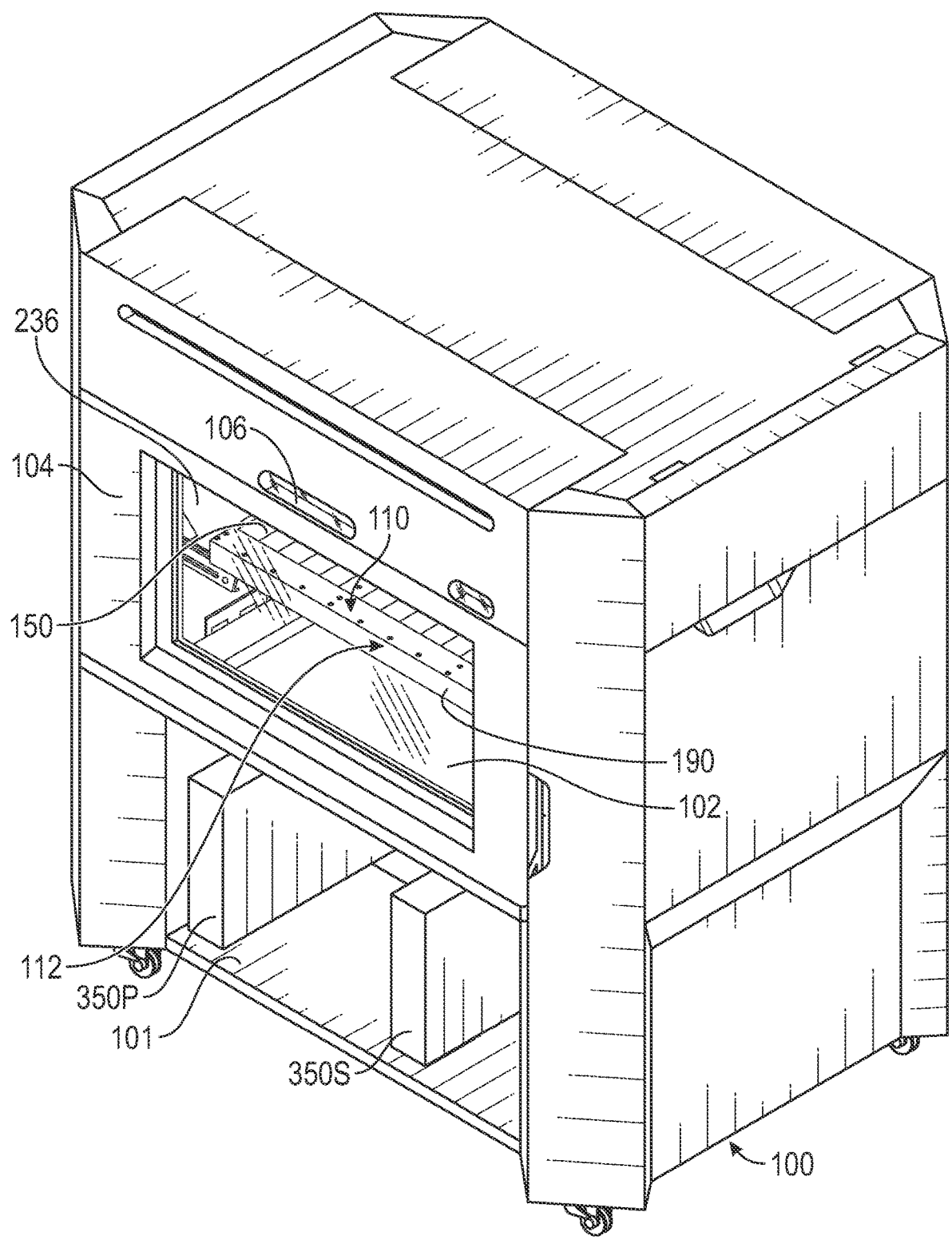
FIG. 3 is a perspective view of an extrusion-based 3D printer.
Figure 4:
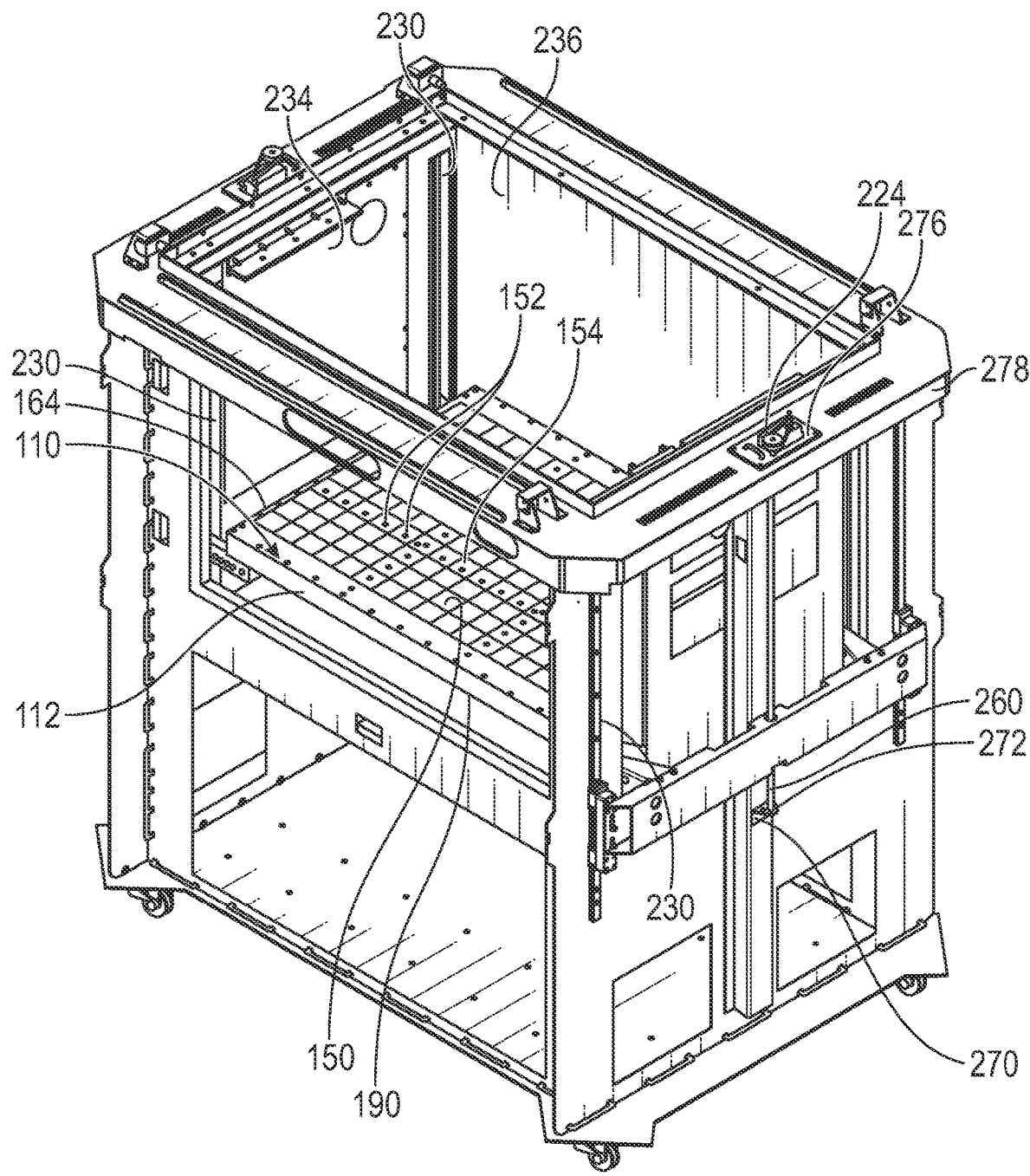
FIG. 4 is a cut away view of the extrusion-based 3D printer.
Figure 5:
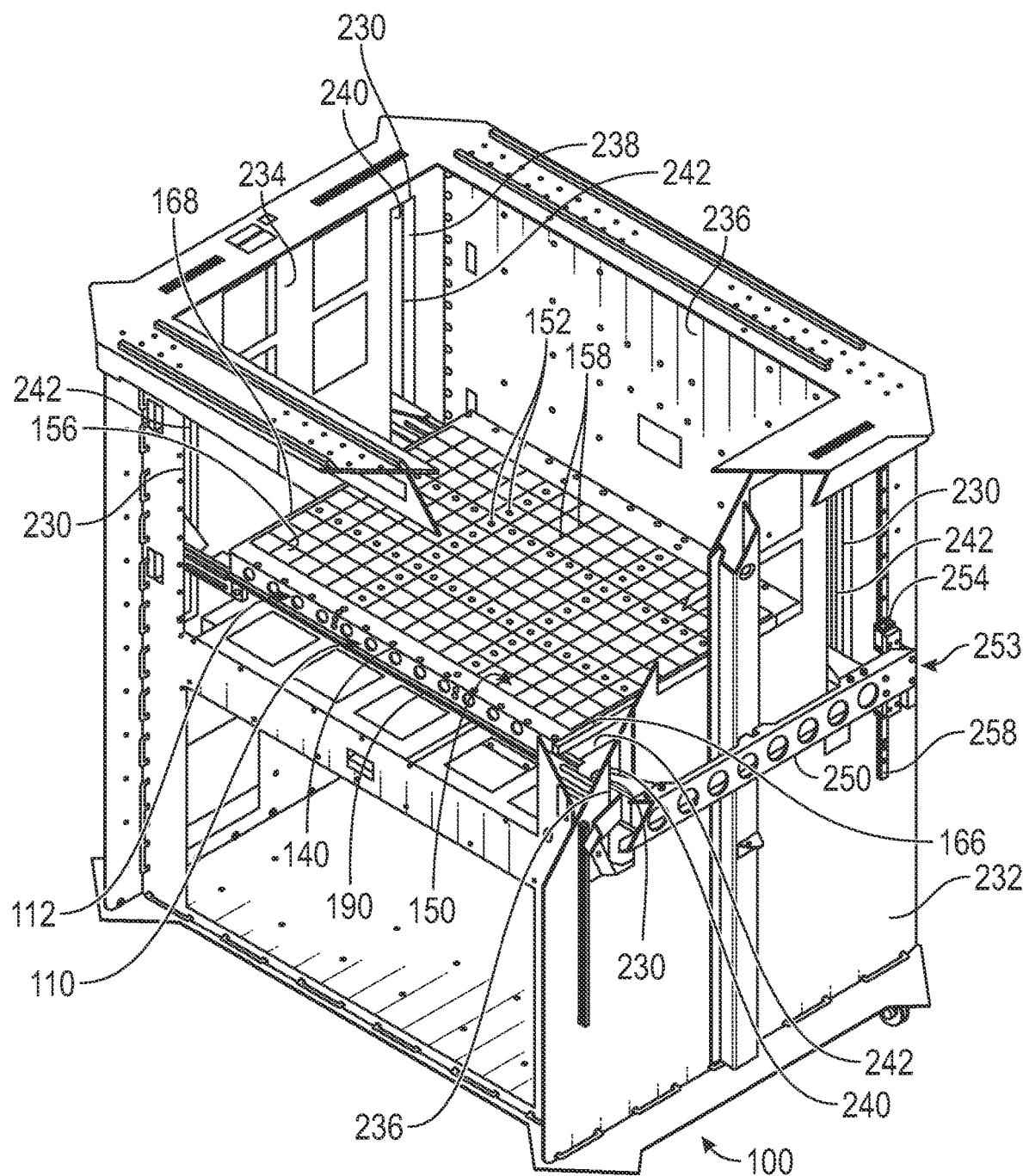
FIG. 5 is another cut away view of the extrusion-based 3D printer.

FIGS. 3-5 illustrate a 3D printer 100 that functions similarly to the printer 10 described in FIGS. 1 and 2 where the print heads are moved in a horizontal x-y plane and the platen is moved in a vertical z direction, and wherein one or more parts and associated support structures can be printed in a layer-by-layer manner by incrementally lowering the platen in the z direction. However, the printer 100 includes a platen assembly 110 that utilizes sheet metal to provide a light weight and yet substantially flat platen 150 for supporting 3D parts and associated support structures in a large format printer, such as wherein the build surface of the platen has a surface area of about 400 sq. inches (e.g., 20 inches by 20 inches) or greater, including without limitation, a surface area of about 576 sq. inches (e.g., 24 inches by 24 inches), or a surface area of about 1280 sq. in (e.g., 32 inches by 40 inches).

Figure 6:
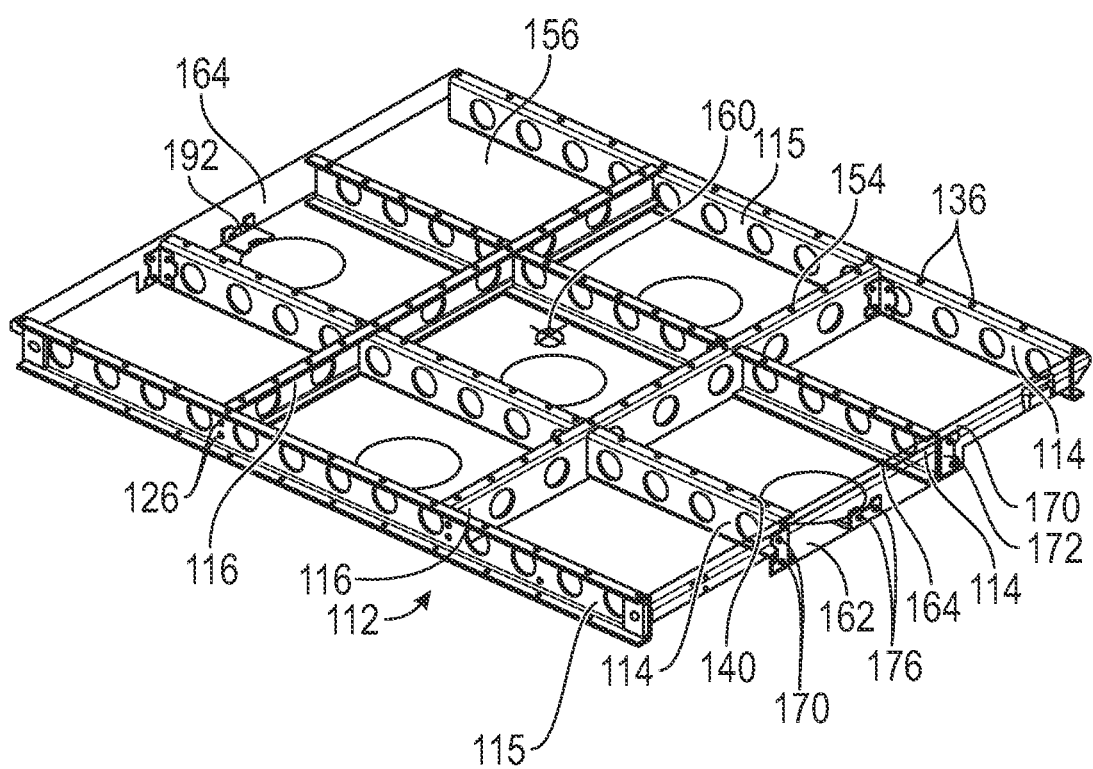
FIG. 6 is a perspective view of a platen assembly where the platen has been removed.
Figure 7:
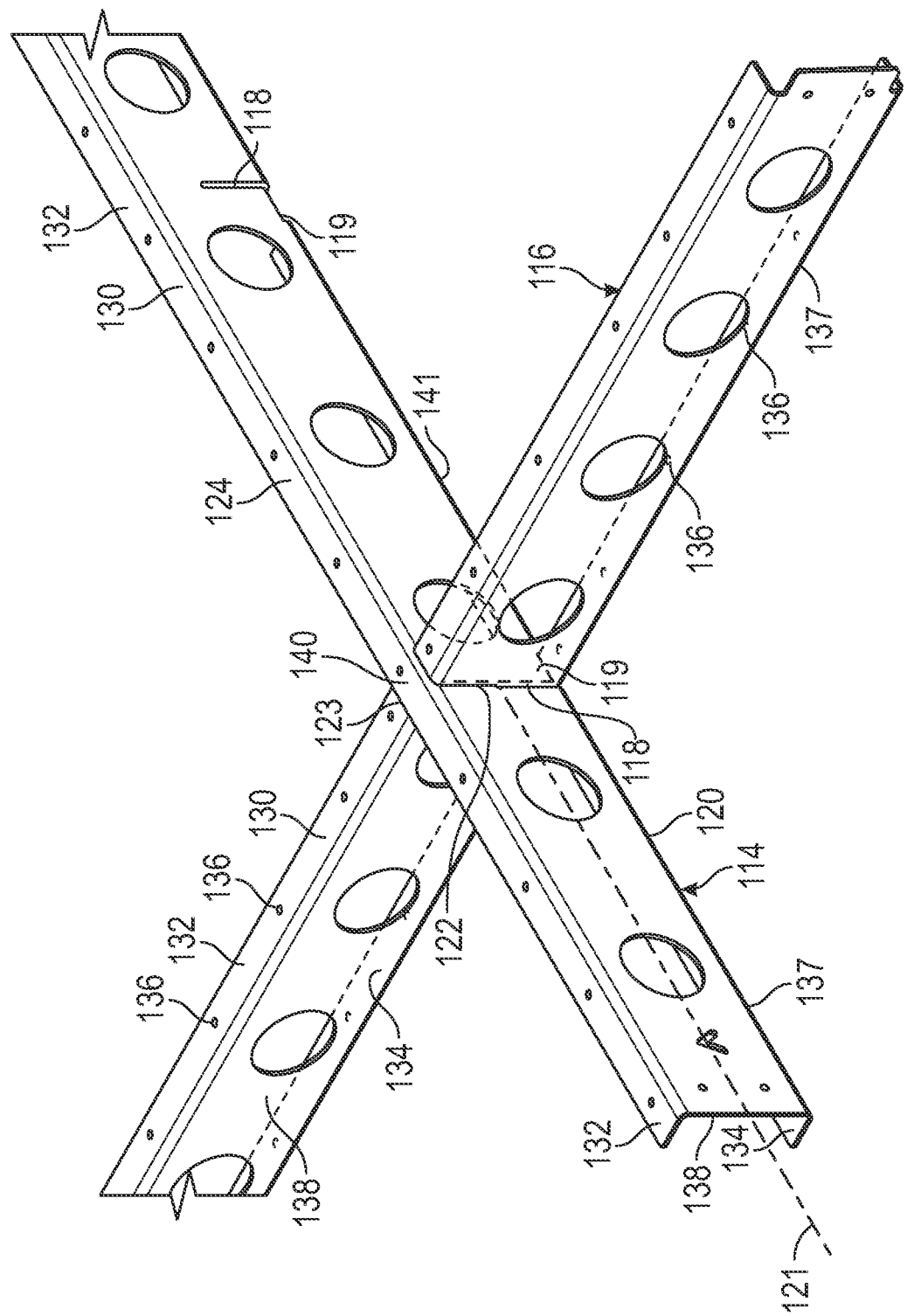
FIG. 7 is a perspective view of interconnected interior x and y direction beams of the grid structure of the platen assembly.
Figure 8:
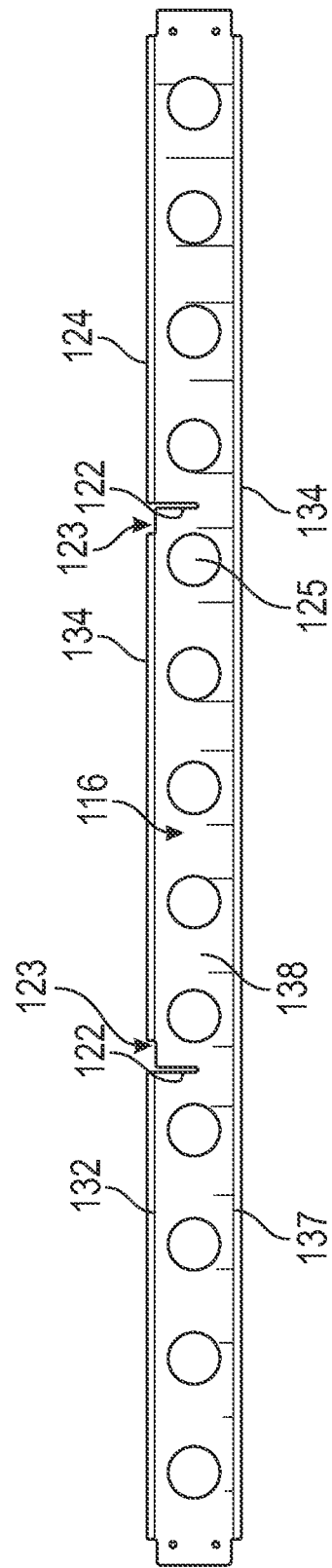
FIG. 8 is a side view of an interior y-direction beam.

Referring to FIGS. 6-8, the platen assembly 110 includes a grid assembly 112 providing an internal grid system, and at least a partial external frame about the internal grid system. The grid assembly 112 is formed by a plurality of spaced apart, interior x-direction beams 114 interconnected with a plurality of spaced apart, interior y-direction beams 116. The plurality of spaced apart, interior x– direction beams 114 include slots 118 extending from a bottom surface 120 to proximate a midplane 121. The plurality of spaced apart, interior y-direction beams 116 include slots 122 extending from a top surface 124 to a midplane 125. The slots 118 and 122 are aligned such that bottom portions of the interior y-direction beams 116 are inserted into the slots 118 of the interior x– direction beams 114 and upper portions of the interior x-direction beams 114 are inserted into the slots 122 of the interior y-direction beams 116.

The grid assembly 112 further includes an exterior frame 113 that includes exterior, x- direction beams 115 secured to ends of the plurality of interior, y-direction beams 116 with spaced apart rivets 126. The y-direction of the exterior frame 113 includes an engagement of tabs extending from edges of platen 150 with the interior, x-direction beams 114 and a bottom sheet 190.

The platen system 110 includes opposing tabs extending from edges 166 and 168 of the platen 150 that are substantially normal to the build surface 156 and include a plurality of apertures that are aligned with apertures in end tabs 172 attached to the interior x-direction beams 114. Rivets are secured through the aligned apertures in the tabs and in end tabs 172 to provide rigidity to the platen system 110. While rivets 126 are a typical securing mechanism, other securing mechanisms are within the scope of the present disclosure including, but not limited to, screws, spring, magnets and welds.

Referring to FIGS. 7 and 8, a typical cross-section of the plurality of x-direction beams 114, 115 and the plurality of the interior, y-direction beams 116 have a "C" cross-section with a top flange 130 and a bottom flange 134 connected with a web 138. The top flange 130 has a substantially flat top surface 132 and the bottom flange 134 has a substantially flat bottom surface 137. The top flanges 130 and the bottom flanges 134 have spaced apart apertures 136. In some embodiments, the apertures 136 are substantially uniformly spaced apart from each other. The bottom flanges 132 of the interior, x-direction beams 114 and the top flanges 130 of the interior, y-direction beams 116 include cutouts 119 and 123 proximate the slots 118 and 122, respectively, to accept the respective flange of the beam positioned in the other direction to a provide a substantially planar top surface 140 and optional planar bottom surface 141.

After the grid assembly 112 is assembled, a piece of sheet metal is attached to the top surface 140 with securing mechanisms, such as rivets 152, to form platen 150. The platen 150 includes spaced apart apertures 154 that align with the apertures 136 in the top flanges 130 of the grid assembly 112. Rivets 152 are then positioned through the aligned apertures 154 and 136 and are used to secure the platen 150 to the grid assembly 112.

When the sheet metal platen 150 is riveted to the grid assembly 112, the platen 150 conforms to the substantially planar top surface 140 of the grid assembly 112 and is held in a flat configuration, such that an upper surface of the platen 150 provides a build surface 156 that is substantially flat, as defined herein. When attached to the grid assembly 114, the platen 150 has a flatness tolerance of less than a 0.020 inch variation over a platen assembly 110 configured for use in a large-scale printer, for example, having a 26 inch by 26 inch square configuration, or a 32 inch by 40 inch rectangular configuration.

The platen 150 may be constructed from an ordinary sheet of metal, such as aluminum or steel, having a thickness greater than 0.006 inches and less than 0.249 inches. The thickness of the platen 150 required to support a part in a flat configuration as it is built is determined based in part upon an expected maximum weight of the part or parts and support structure(s) being printed, and the distance between the x-direction beams 114, 115 and the y-direction beams 116, 117 of the grid assembly 112. In a non-limiting example, the platen 150 is about a nominal ⅛ of an inch thick rectangular 24×24 metal sheet, and the grid assembly 112 is a 4×2 grid (comprising an exterior grid and a 2×2 interior grid).

In some embodiments, the spaced apart apertures 154 are countersunk and the rivets 152 have a countersunk head. Using the countersunk rivets 152 with the countersunk apertures 154 maintains the substantially planar build surface 156.

The platen 150 also may include a plurality of interconnected grooves 158 that are in communication with a vacuum port 160 that is fluidly coupled to a vacuum system 161. The interconnected grooves 158 are sufficiently shallow and spaced apart that when a build substrate is secured to the build surface 156 with the vacuum, the build surface is substantially flat and planar.

Figure 9:
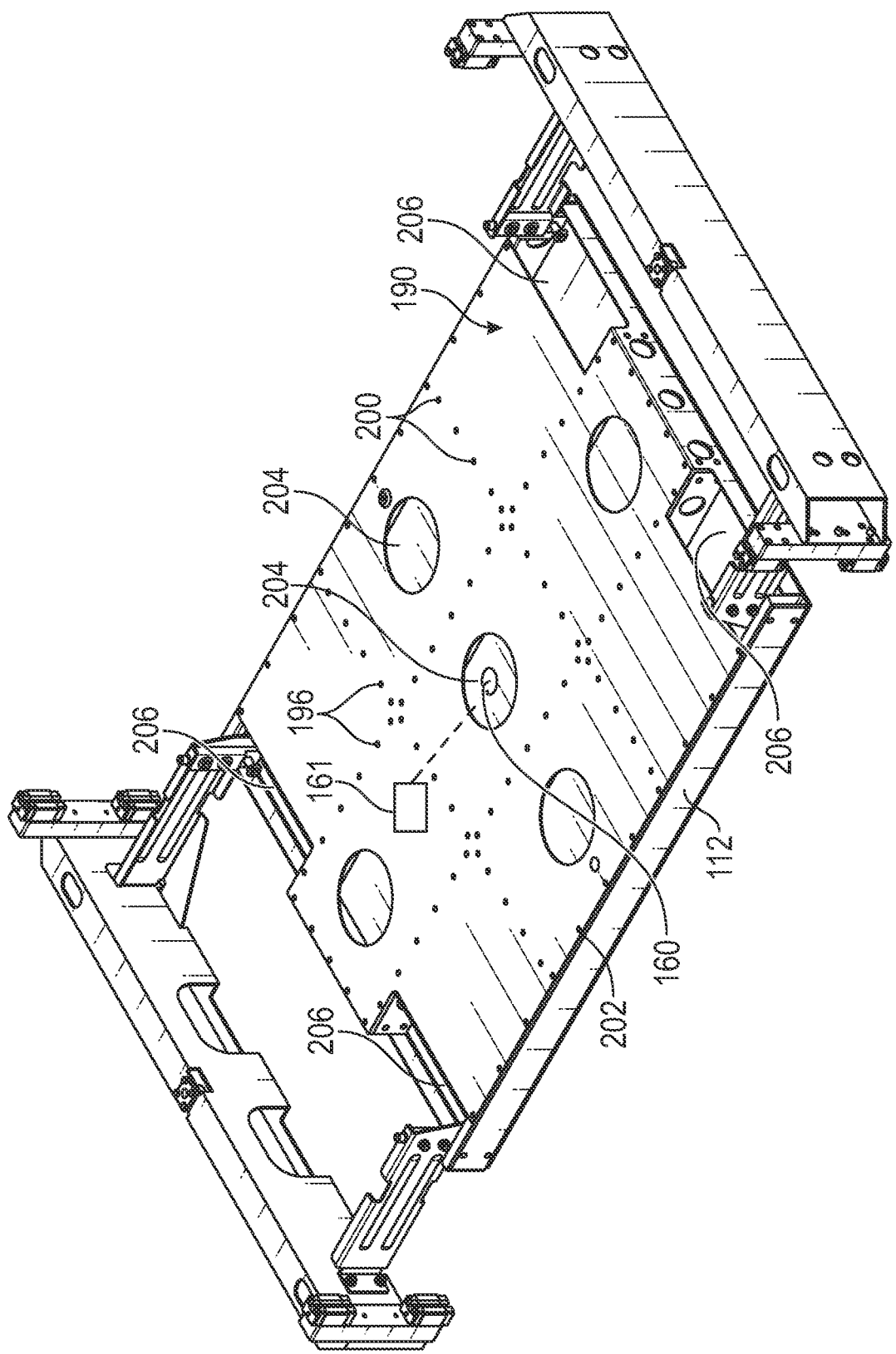
FIG. 9 is a perspective view of the platen assembly from a bottom perspective.

Referring to FIG. 9, the bottom sheet 190 includes a plurality of spaced apart apertures 196 that are aligned with spaced apart apertures 137 in the bottom flanges 13 of the x-direction beams 114 and y-direction beams 116. Rivets 200 are positioned within the aligned apertures 196 and secure the bottom sheet 190 to the grid system 112. Due to the substantially planar lower surface 202 of the grid system 112, when the bottom sheet 190 is secured to the grid system 112, the bottom sheet 190 conforms to the substantially planar lower surface 202, such that the bottom sheet 190 is substantially parallel to the build surface 156 of the platen 150. However, the bottom sheet 190 does not require a substantially planar lower surface, as the bottom sheet 190 is used for support and rigidity, and not for supporting a part and associated support structures.

The bottom sheet 190 includes a plurality of access holes 204 that provide access to the vacuum ports 160 in the platen 150 through the grid system 112 and also provide access to spaces in the grid system 112 that would otherwise be closed. The bottom sheet 190 also includes cutouts 206 in the corners of the bottom sheet 190 to provide access to the spaces in the grid system 112 and between the platen 150 and the bottom sheet 190.

The platen 150, the grid assembly 112, the bottom sheet 190 and the frame 113 of the platen assembly 110 are constructed of the same material having substantially the same thickness. However, the present disclosure can utilize components of the platen that are of different compositions with similar thermal expansion properties. Using a grid structure 112, the platen 150, the bottom sheet 190 and the frame 113 being made of a similar material causes all components to expand and contract at the same rate. By supporting each corner of the platen assembly 110, the entire platen assembly 110 expands linearly in X, Y, & Z directions and therefore does not affect overall flatness of the platen 150 as the platen assembly 110 is heated and cooled.

Figure 10:
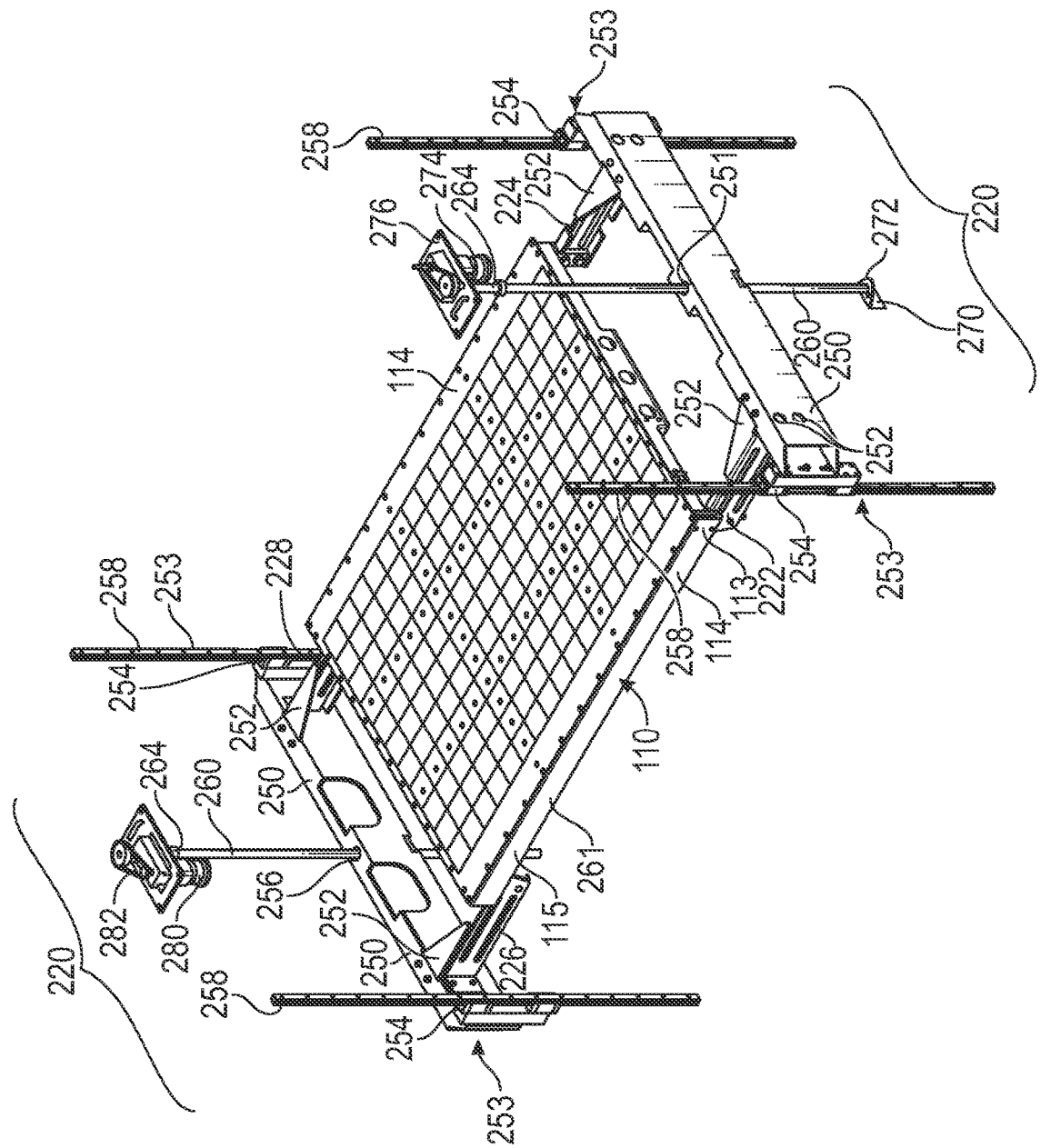
FIG. 10 is a schematic view of the platen assembly with an actuating system.
Figure 11:
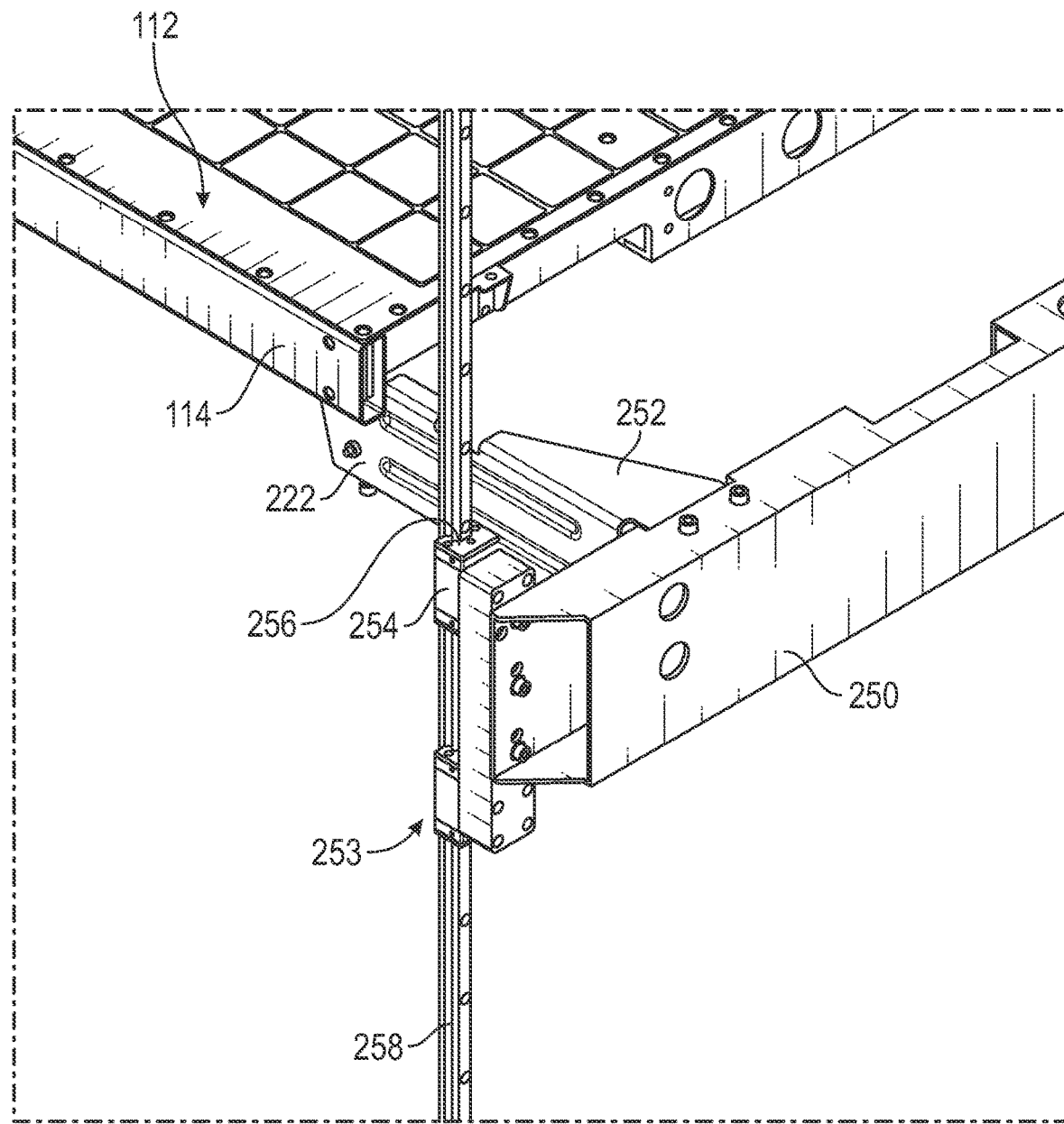
FIG. 11 is a close up view of a linear guide of the actuating system.

Referring to FIGS. 10 and 11, an actuating system 220 is used to incrementally move the platen system 110 in the z direction, after a layer is printer. The actuating system 220 is connected to the exterior, x-direction beams 114 proximate opposing ends 113 and 115 with mounting brackets 222, 224, 226 and 228 that extend through slots 230 in the side walls 232 and 234 of a chamber 236. The slots 230 are covered by flaps 238 and 240 of material that allow the mounting brackets 222, 224, 226 and 228 to move through a slit 242 between free ends of the overlapping flaps 238 and 240 (as best illustrated in FIG. 5). The flaps 238 and 240 allow for movement of the platen system 110 in the z direction while minimizing the loss of heat from the chamber 236, as similarly to the overlapping flaps 33 and 35 used to isolate the print head from the thermal chamber.

Each bracket 222, 224, 226 and 228 is secured to a cross bar 250 typically with threaded bolts 252 threadably engaging threaded bores in the cross bar 250 of the actuating system 220. In some embodiments, a gusset plate 254 is secured to the mounting brackets 222, 224, 226 and 228 and the cross bar 250 to provide additional rigidity at the connection between the mounting brackets 222, 224, 226 and 228 and the cross bar 250.

The actuating system 220 includes spaced apart carriages 254 of a linear guide 253 secured to the cross bar 250 at locations that are substantially an equal distance from a midpoint of the cross bar 250. The carriage 254 includes a channel 256 that has a complimentary configuration or profile to a configuration or profile of a substantially vertical rail 258 of the linear guide 252, where the substantially vertical rails 258 are secured to an outer surface the side walls 232 and 234 of the chamber 236. The engagement of the carriages 254 with the substantially vertical rails 258 minimizes movement of the platen system 110 in the x direction and the y direction while allowing for movement in the z direction.

The cross bar 250 includes a threaded through bore 251 substantially at the midpoint thereof, where a threaded shaft 260 is threadably engaged with the threaded bore 251. A bottom end 262 of the threaded shaft 260 is rotatably secured within a receptable 272 of a bottom mounting bracket 270. A top end 264 of the shaft is positioned through a through bore 274 in a member 276 of a frame 278 of the printer 100. With the top end 264 and the bottom end 262 rotatably secured, when a motor 280 causes the shaft 260 to rotate in place and about an axis of rotation 261, such as with a drive belt 282, the cross bar 250 moves in the z direction while the carriages 254 travel on the substantially vertical rails 258. As there are two actuating systems 220 located beyond the heated chamber 232 and 234 of the chamber 236, the present disclosure utilizes two independently operated motors 280 and drive belts 282. While motors with drive belts are disclosed, any suitable drive can be utilized to rotate the threaded shaft 260, including, but not limited to, a gear box and a direct connection of a rotational actuator with the threaded shaft 260.

Figure 12:
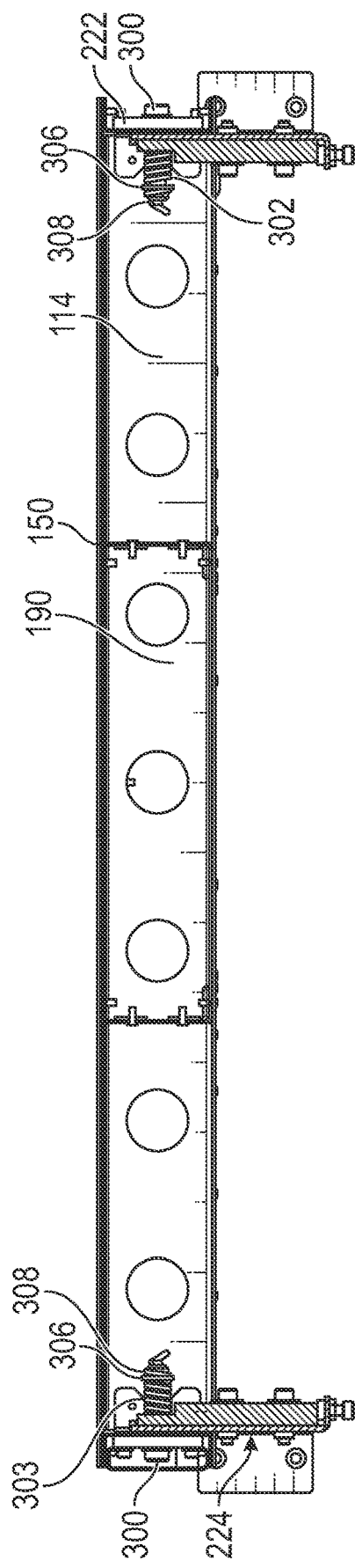
FIG. 12 is a schematic cut away view showing a compensation system to accommodate y direction thermal expansion of the platen.
Figure 13:
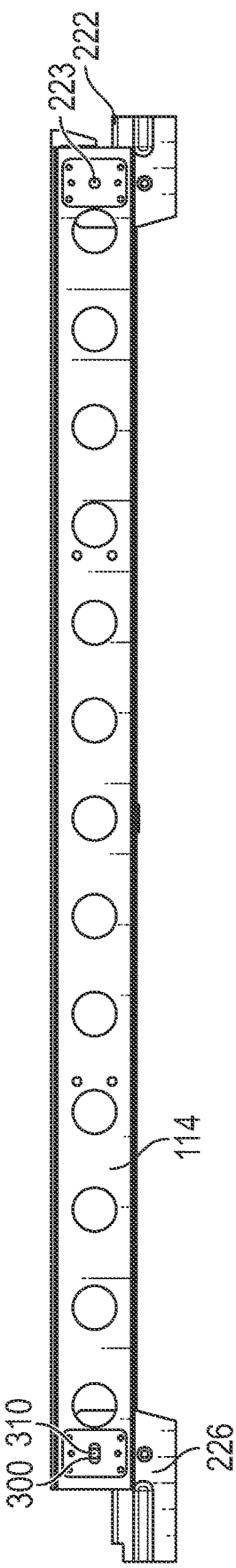
FIG. 13 is a schematic cut away view showing a compensation system to accommodate x direction thermal expansion of the platen.

Referring to FIGS. 12 and 13, as the cross bars 250 are in a fixed location in the x-y plane and the platen system 110 is secured to the cross bars 250 with the four mounting brackets 222, 224, 226 and 228 on opposing ends of the platen system 110, the present disclosure must account for thermal expansion as the platen system 110 is heated to printing temperatures. To accommodate for expansion in the y direction, the outer x direction beams 114 are secured to the mounting brackets 222 and 224 with bolts 300 through circular apertures 223 in the brackets 222 and 224 and the outer x direction beams 114. A compression spring 302 is positioned about the shaft of the bolt 300 and are secured with a washer 306 and a nut 308 for the connection of the platen system 110 to the mounting bracket 222. The mounting bracket 224 is secured to the other x direction beam 114 in a similar manner with the bolt 300, washer 306 and the nut 308. However, a spring 303 has a spring force that is less than the spring force of the spring 302. As such, as the platen system 110 expands in the y direction the spring 303 will compress while the platen system 110 is maintained in substantially a same location in both the x and y direction at the bracket 222. The platen system 110 does not move in the x direction because the bolt 300 is positioned through an aperture.

The bracket 226 is attached to the outer x direction beam 114 in a similar manner to that of the attachment of the bracket 222 to the outer x direction beam with the spring 302. The bracket 228 is attached to the other outer beam 114 in a similar manner as the attachment of the bracket 224 to the other outer x direction beam 114 with the spring 302. As such, as the platen system 110 expands in the y direction as the springs 303 compress.

The outer x direction beams 114 include a slot 310 through which the bolt 300 is inserted at the mounting brackets 226 and 228. A length of the slots 310 allows the platen 114 to expand and contract in the x direction due to thermal expansion.

As such, the location of the platen system 110 relative to the mounting bracket 222 is substantially fixed, the location of the platen system 110 at the mounting bracket 224 allows for movement in the platen 114 in the y direction, the attachment of the platen to the bracket 226 allows the platen system 110 to move in the y direction and the attachment of the bracket 228 to the platen system 110 allows for movement of the platen in both the x and y direction. The combination of the biasing springs 302 and 303 and the circular apertures and slots 310 allows the platen system 110 to expand in the x and y directions while maintaining a known position due to the connection of the platen system 110 to the mounting bracket 222. However, any of the mounting brackets 224, 226 and 228 could be utilized to locate the position of the platen system 110.

As best illustrated in FIG. 3, in operation, one or more supplies of filament material 350$p$ and 350$s$ are positioned in a space 101 below the chamber 236 and fed through filament feed paths to print heads. The chamber 236 is then heated to a selected temperature relative to the material being printed. Because the platen system 110 has the grid structure 112 and is not a solid machined piece of metal, the platen system 110 heats significantly faster than a solid, metal platen. Once the chamber 236 is at the selected temperature the platen system 110 is raised by the actuator systems 220 to a starting location proximate the print heads. When the platen 114 is located proximate the print heads, the platen 150 and the build surface 156 are not visible through a window 102 in a door 104 of the printer 100. The printer 100 includes a second window 106 above the door 104, which allows the platen 150, the build surface 156 and the initial build layers to be viewed therethrough, as the platen system 110 is in its highest position inside the printer. As the platen system 110 is lowered in the z direction, the platen system 110 and lower portion of the part and support structure are then visible through the window 102 in the door 104. The build is continued in the layer-wise manner until the part or parts and necessary support structures are printed.

Figure 14:
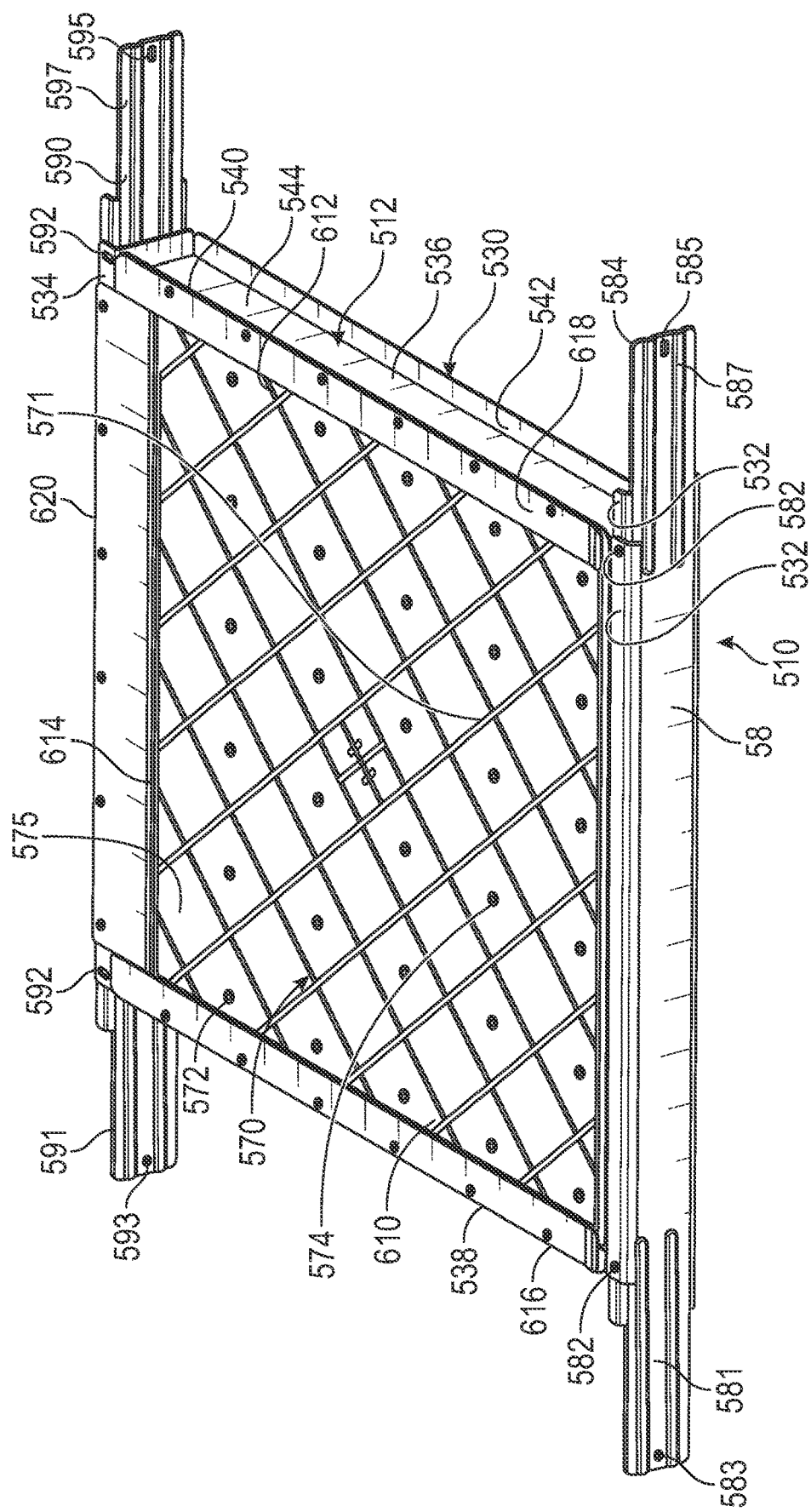
FIG. 14 is a top perspective view of an alternate embodiment of a platen assembly.
Figure 15:
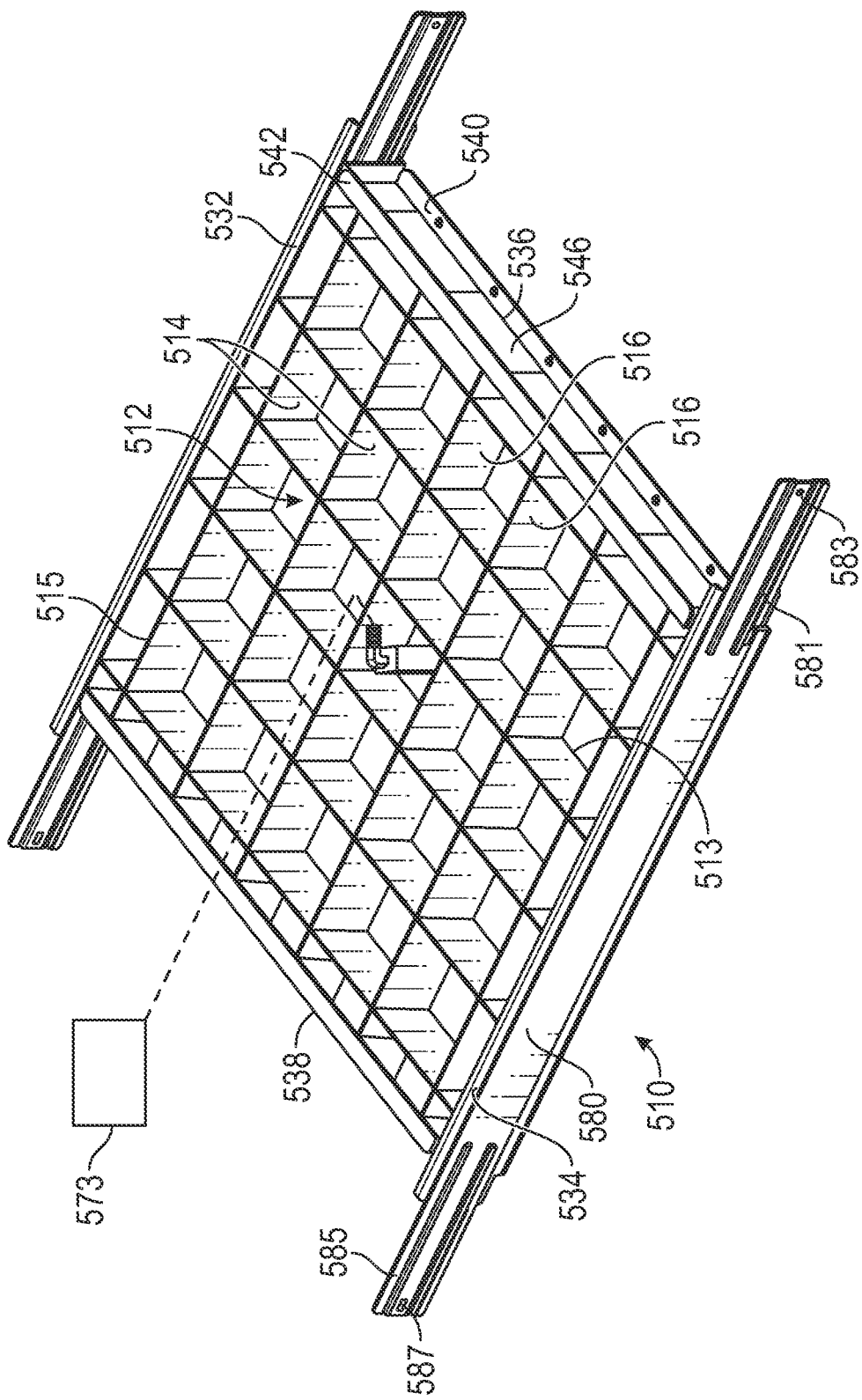
FIG. 15 is a bottom perspective view of the alternate platen assembly.

An alternative embodiment of a platen assembly is illustrated at 510 at FIGS. 14 and 15. The platen assembly 510 includes a sheet metal platen 570 secured to a grid assembly 512 that is formed by a plurality of spaced apart, interior x-direction beams 514 interconnected with a plurality of spaced apart, interior y-direction beams 516.

Figure 16:
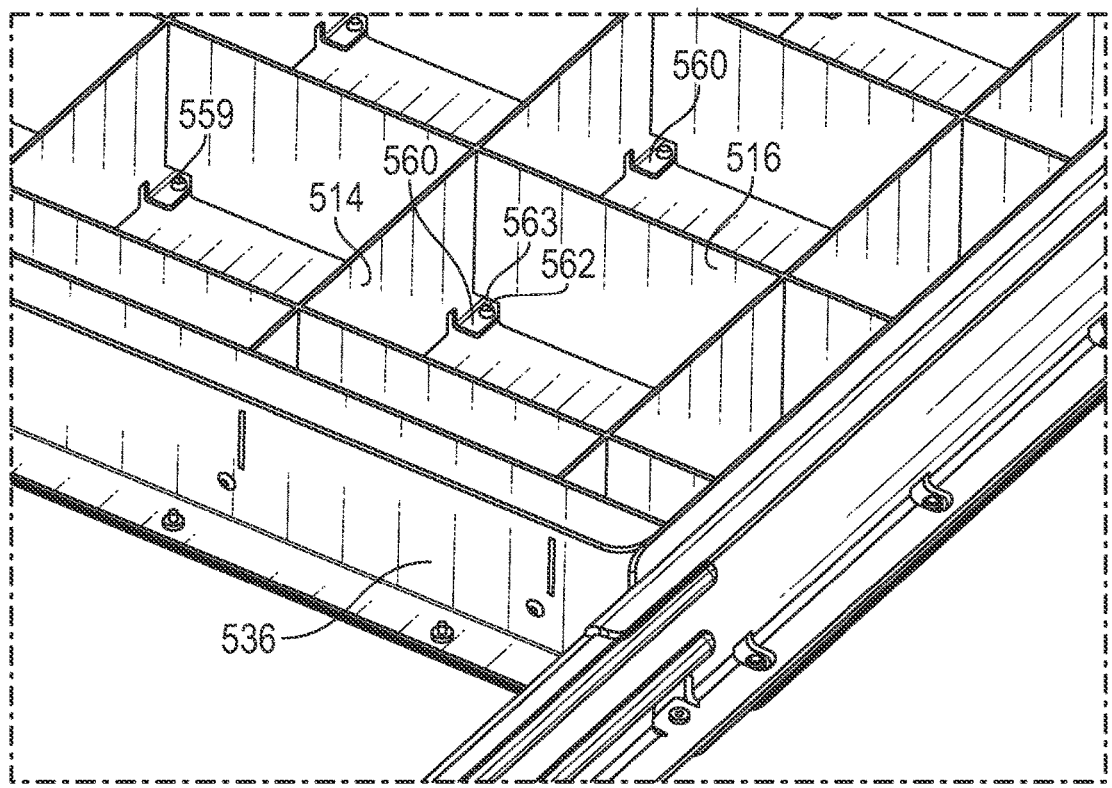
FIG. 16 is a close up view of the alternate platen assembly from the bottom.
Figure 17:
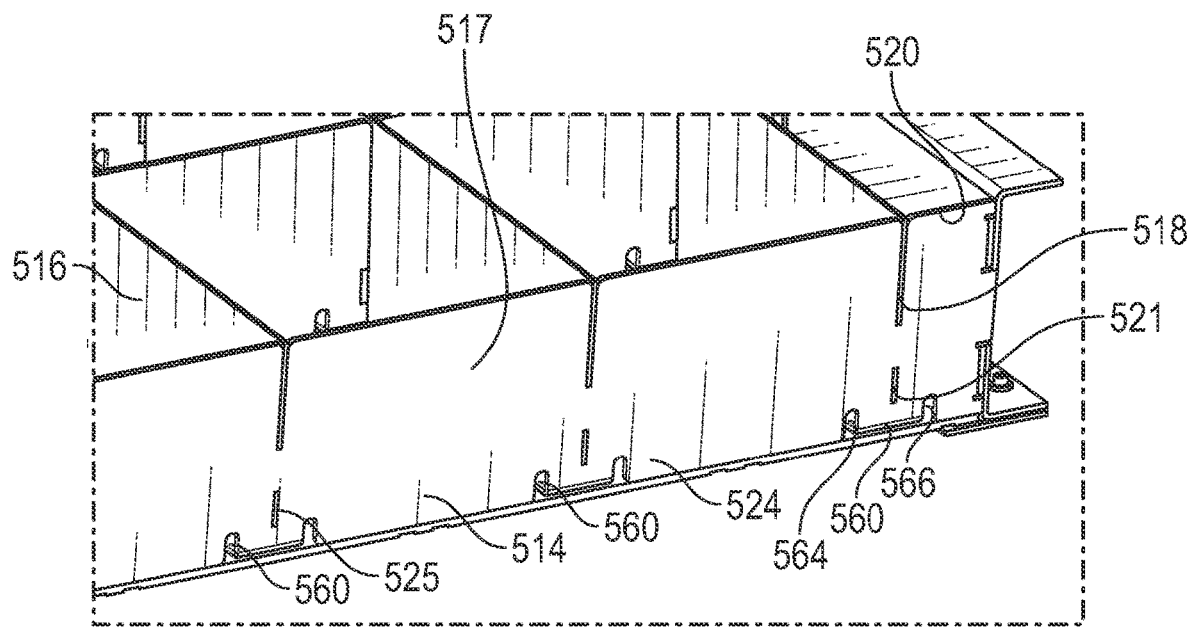
FIG. 17 is a cut-away view of the alternate platen assembly.

Referring to FIGS. 16 and 17, the plurality of spaced apart, interior x-direction beams 514 include slots 518 extending from a bottom edge 520 to proximate a midplane 517 and a connecting slot 521 between the midplane and a top edge 524, where the slots 519 and 521 are aligned. The plurality of spaced apart, interior y direction beams 516 include a plurality of spaced apart slots 522 extending from a top edge 524 to the midplane and a tab 525 extending into the slot 522. The slots 518 and 522 are aligned such that bottom portions of the interior, y-direction beams 516 are inserted into the slots 518 of the interior, x-direction beams 514 and upper portions of the interior, x-direction beams 514 are inserted into the slots 522 of the interior, y- direction beams 516. When the interior x-direction beams 514 and the interior, y- direction beams are inter-connected, the tab 525 is positioned within the connecting slot 521 which retains the interior x and y beams 514 and 516 together as an interior grid. The slot 522 has a wedge shape to provide sufficient clearance for the tab 525 to be inserted into the connecting slot 521. However, other configurations of the slot 521 are within the scope of the present disclosure.

The grid assembly 512 includes an exterior frame 530 that includes exterior x-direction beams 532 and 534 and exterior y-direction beam beams 536 and 538. The exterior x-direction beams 532 and 534 and exterior y-direction beams 536 and 538 have a substantially "C" shaped configuration, with upper and lower flanges 540 and 542 joined by a web 544.

Figure 18:
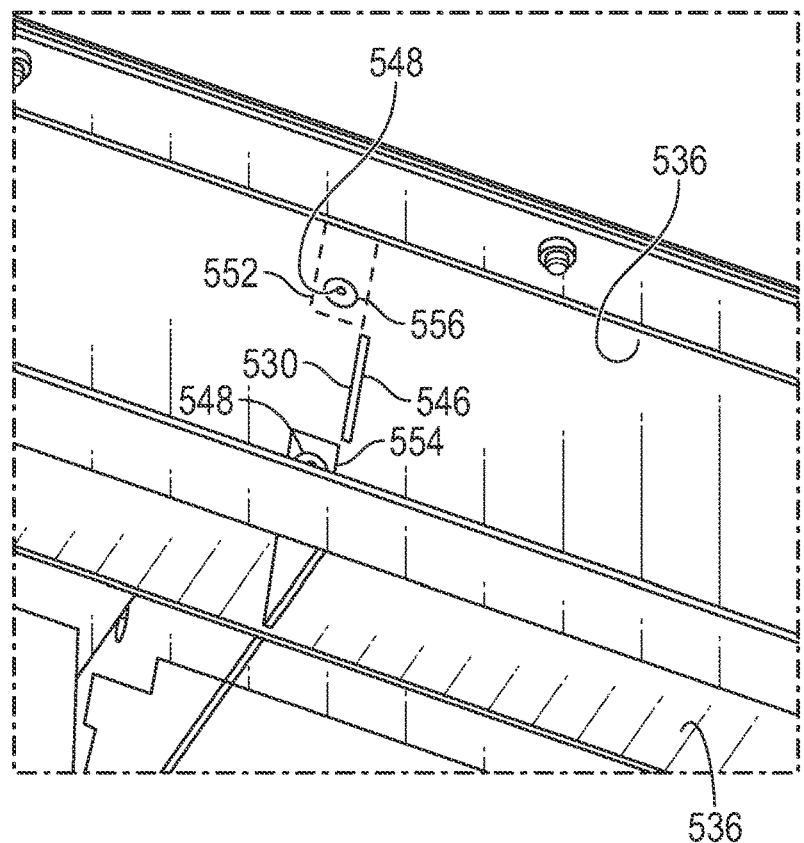
FIG. 18 is a close up view of the other alternate platen assembly from a side.

Referring to FIG. 18, the webs 544 of the exterior y-direction beams 536 and 538 include slots 546 and spaced apart apertures 548 offset form the slot 546. The slots 546 accept tabs 550 extending from ends of the interior x-direction beams 514. The interior x-direction beams 514 also include substantially spaced apart mounting tabs 552 and 554 that are substantially orthogonal to the x-direction beams 514 and substantially parallel to and abutting the exterior y-direction beams 536 and 538. The mounting tabs 552 and 554 include apertures that align with the apertures 548 such that rivets 556 can be inserted through the apertures to secure the exterior, y-direction beams 536 and 538 to the interior x-direction beams 514.

The attachment of the exterior x-direction beams 532 and 534 to the spaced apart interior, y-direction beams 516 is similar to that of the exterior y-direction beams 532 and 534 to the interior x-direction beams 514. The webs 544 of the exterior x-direction beams 532 and 534 have a similar configuration with spaced apart slots and offset, spaced apart apertures as the webs 544 of the exterior y-direction beams 536 and 538. The interior, y-direction beams include the tab 550 that is configured to be positioned into the slot 546 and the spaced apart mounting tabs 552 and 554 that are orthogonal to the interior, y-direction beams 516 such that apertures in the web 544 align with apertures in the mounting tabs 552 and 554 where rivets 556 secure the exterior, x-direction beams 532 and 534 to the interior, y direction beams.

Figure 19:
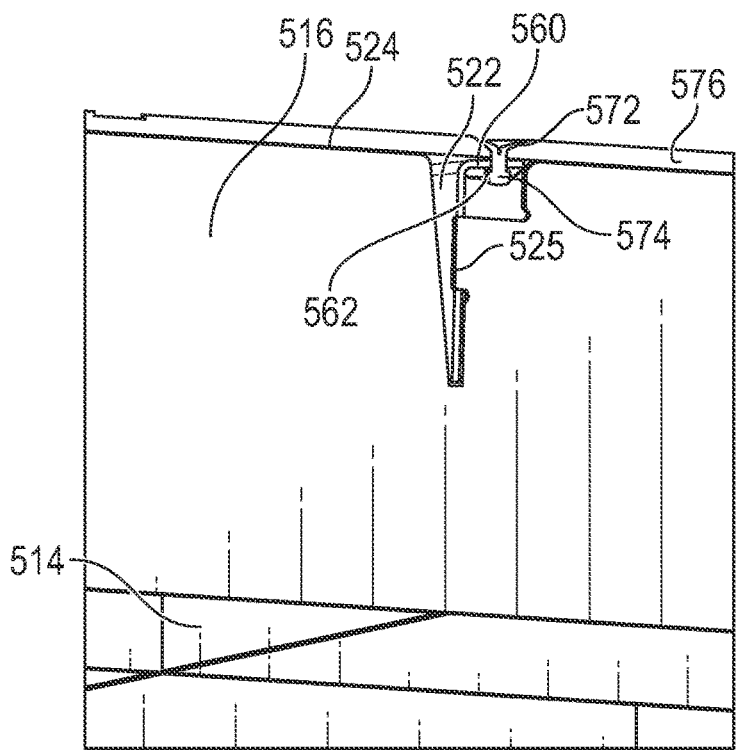
FIG. 19 is another cut-away view of the alternate platen assembly.

Referring to FIGS. 16 and 19, the interior x-direction beams 514 include a plurality of platen mounting tabs 560 that are substantially orthogonal to the interior x-direction beams 514 and are substantially level with the upper surfaces of the interior and exterior x and y beams. The platen mounting tabs 560 include an aperture 562 that is centered on an interior y-direction beam 516 where the interior y-direction beams have cutouts 563 below the platen mounting tabs 560 such that a rivet 559 can be extended therethrough without interference from the interior, y-direction beams 516. The interior x-direction beams 514 have cavities 564 and 566 into the web on opposite sides of the platen mounting tabs 560 to aid in bending the platen mounting tabs 560 to a substantially orthogonal position relative to the x-direction beam 514.

Referring back to FIGS. 14 and 15, with the grid assembly 512 consisting of the internal grid on the interconnected interior x-direction beams 514 and the interior y-direction beams 516 and the exterior frame 350 assembled, a thin metal sheet provided as platen 570 is positioned on the upper surface of the grid assembly 512 where apertures 572 in the platen 570 are aligned with the apertures 562 in the platen mounting tabs 560 and apertures in the members of the frame 350. Rivets 574 are positioned in the aligned apertures and are used to secure the platen 570 to the grid assembly 512 such that a build surface 575 is substantially flat.

An exemplary technique for manufacturing the interior, x-direction beams 514 and the interior, y-direction beams 516 includes laser cutting and or water jet cutting of sheets of metal, such as, but not limited to ten gauge steel. However, other thicknesses of metal are also within the scope of the present application. The selection of metal type should preferably be consistent for both the beams and the platen material, when a heated build chamber environment is used, to maintain similar thermal expansion characteristics through the platen assembly.

A first x-direction mounting beam 580 is positioned within a channel of the exterior, x-direction beams 532 and is secured with rivets 582 between an upper flange of the x-direction beam 532 and an upper surface 584 of the first x-direction mounting beam 580. A second x-direction mounting beam 590 is positioned within a channel of the x-direction mounting beam 534 and is secured with rivets 592 between an upper flange of the x-direction beam 534 and an upper surface 594 of the second x-direction mounting beam 590.

The platen assembly is configured to be secured to a z-stage actuating assembly utilizing the first and second x-direction mounting beams 580 and 590 with different configurations to allow the platen assembly 510 to expand and contract in the x and y directions as the platen assembly 510 is heated and cooled.

The second x-direction mounting beam 590 includes a circular aperture 593 proximate the end 591 and a slot 595 proximate the end 597. The first x-direction mounting beam 580 includes a circular aperture 583 proximate the end 581 and a slot 587 proximate the end 587. The first and second x direction beams 580 and 590 are connected to a z-stage actuating system with bolts having different spring bias and the use of the slots 587, 597 to allow for thermal expansion in the x and y direction as discussed with respect to FIGS. 12 and 13.

As the components of the platen assembly 510 are constructed of the same material with substantially the same thickness, the thermal expansion of the platen assembly 510 is relatively constant in the x, y and z direction. As such the presently disclosed platen assembly 510 allows for thermal expansion as the platen assembly 510 is heated while maintaining a substantially flat build surface 575 of the platen 570 for accurately printing parts in a layer-wise manner.

In operation, a sheet of substrate material is positioned into slots 610 and 612 along the y-direction sides and a back x-direction slot 614. Members 616, 618 and 620 forming the slots 610, 612 and 614, respectively prevent the substrate from curling when heated, such as disclosed in Swanson, U.S. Pat. No. 10,471,658, which is hereby incorporated by reference in its entirety. As the substrate material is heated, the substrate material becomes softer and conforms the platen 570. The platen 570 includes interconnected grooves 571 which are in communication with a vacuum source 573. The vacuum source 573 pulls a vacuum on the substrate to retain the substrate to the platen 570 during the printing process. After the printing process is completed, the vacuum source 573 is disconnect which allows the printed part and the substrate to be removed from the platen 570. However, the substrate can also be secured to the platen other securing mechanisms, such as but not limited to a magnetic connection.

It is been observed that the build surface 156 of platen assembly 112 and that the build surface 575 of platen assembly 510 will maintain is flatness tolerance over the operating temperatures of the printer 100. A 26 inch×26 inch platen assembly of the present invention constructed of ⅛" nominal steel sheet will maintain tolerance to less than or equal to 0.010" of flatness variation, over a range from room temperatures from ambient (20 C) to a 300 C set point. A 32 inch×40 inch platen assembly of the present invention constructed of ⅛" aluminum sheet will maintain tolerance to less than or equal to 0.02 inches of flatness variation over a range from room temperature (20 C) to a 150 C set point. In comparison, the flatness tolerance for commercially available 'as rolled', unconstrained 10 gage steel sheet varies by 0.125" or more, for sheet widths up to 36 inches; and the flatness tolerance for a 10 gage aluminum sheet is 0.313" for widths up to 36 inches, even at ambient temperatures. When heated, flatness tolerance would become significantly poorer.

The exemplary platen assemblies 112 and 510 advantageously provide a weight reduction of 50 percent or greater as compared to existing metal platens. By way of example, the platen in the Fortus® F900® printer is constructed of carbon steel that is 26 in. by 38 in. with a thickness of 0.45 in. The platen in the Fortus® F900® printer has a surface area of 1,368 sq. in. and weighs about 175 pounds. In contrast, the 32 in. by 40 in. aluminum platen assembly disclosed herein has a surface area of 1,280 sq. in. and the grid structure illustrated in FIG. 6, weighs about 27 pounds. The disclosed 24 in. by 24 in. steel platen assembly has a surface are of 576 sq. in. and the grid structure illustrated in FIG. 16, weighs about 56 pounds.

Although the present disclosure has been described with reference to preferred embodiments, workers skilled in the art will recognize that changes may be made in form and detail without departing from the spirit and scope of the disclosure.

The invention claimed is:

1. A 3D printer comprising:
   a heated build chamber comprising opposing side walls, each opposing side wall having a plurality of spaced apart slots; and
   a platen assembly within the chamber, the platen assembly comprising:
      a grid assembly comprising at least six independent beams forming at least a 4 ×2 framework of interlocked perpendicular x direction beams and y direction beams, providing a substantially planar upper surface and a lower surface, wherein the grid assembly comprises:
         an interior grid comprising at least two x direction beams interconnected with at least two y direction beams; and
         an exterior frame comprising exterior beams that at least partially surrounding the interior, wherein the exterior frame surrounds the interior grid; and
      a platen comprising a metal sheet supported on the upper surface of the grid assembly and secured to the grid assembly such that the upper surface provides a substantially flat build surface;
      wherein the x direction beams, the y direction beams and the platen are constructed of substantially a same material having substantially a-same thermal expansion properties; and
      wherein the build surface of the platen has a build surface area of at least 400 square inches and maintains its flatness to within a flatness tolerance of 0.020 inches over a temperature range of at least 20C-300C.

2. The 3D printer of claim 1 and further comprising:
   a z actuator system comprising first and second actuators, each actuator attached to an exterior surface of each of the opposed side walls of the chamber, each of the first and second actuators comprising:
      a cross beam having a first end and a second end, the cross beam comprising a substantially centrally located threaded bore;
      a plurality of spaced apart mounting brackets attaching the cross beam to the platen wherein each mounting bracket extends through one of the slots of the plurality of slots; and
      a threaded rod rotatably engaging the threaded bore, wherein as the rod is rotated, the cross beams move on the threaded rods and the platen moves in a z direction.

3. The 3D printer of claim 2, wherein each of the first and second actuators further comprises:
   spaced apart rails on each of the exterior surfaces of the side walls, wherein the spaced apart rails are substantially equally spaced from the threaded rod; and
   spaced apart linear bearings attached to the cross beam, wherein the spaced apart linear bearings engage the spaced apart rails and substantially prevent movement of the cross bar in a x-y plane as the cross bar moves in the z direction.

4. The 3D printer of claim 2, wherein the plurality of spaced apart mounting brackets comprises:
   a first mounting bracket attached proximate a first edge of a first side of the platen with a first fastening mechanism through a substantially circular aperture in the grid of beams having a first biasing mechanism with a first biasing force;
   a second mounting bracket attached proximate a second edge of the first side of the platen with a second fastening mechanism through a substantially circular aperture in the grid of beams having a second biasing mechanism with a second biasing force, wherein the second biasing force is less than the first biasing mechanism;
   a third mounting bracket attached proximate the first edge of a second side of the platen with a third fastening mechanism through a longitudinal slot in the grid of beams having a third biasing mechanism with the first biasing force;
   a fourth mounting bracket attached proximate the second edge of the second side of the platen with a fourth fastening mechanism through a longitudinal slot in the grid of beams having fourth biasing mechanism with the second biasing force; and
   wherein as the platen assembly expands in the y direction the second and fourth biasing mechanisms compress to compensate for thermal expansion in the y direction and wherein the third and fourth fastening mechanisms move in the longitudinal slots to compensate for thermal expansion in the x direction.

5. The 3D printer of claim 2 and further comprising overlapping flaps attached to the exterior surface the opposing sidewalls such that each of the plurality of slots are substantially covered and wherein the flaps are sufficiently flexible to allow the mounting brackets to move between the overlapping flaps.

6. The 3D printer of claim 1, wherein the chamber comprises:
   a front panel with a door hingedly attached thereto; and
   a window above the door to expose a space above the platen.

7. The 3D printer of claim 1, wherein the x and y direction beams of the interior grid and the exterior frame are constructed of substantially a same thickness with substantially a same cross-sectional configuration.

8. The 3D printer of claim 1, wherein the x and y direction beams of the interior grid and exterior frame are constructed of substantially a same material with substantially a same thickness with different cross-sectional configurations.

9. The 3D printer of claim 1, wherein the platen has a thickness of between 0.006 inches and less than 0.249 inches.

10. The 3D printer of claim 1, wherein the grid assembly and the platen are constructed of aluminum, the platen has a thickness of about ⅛ inch, and the flatness tolerance is less than 0.020 inches.

11. The 3D printer of claim 1, wherein grid assembly and the platen are constructed of steel, the platen has a thickness of about ⅛ inch, and the flatness tolerance is less than 0.010 inches.

12. The 3D printer of claim 1 wherein each beam x-direction beam and each y direction beam of the grid assembly have a "C" shaped cross section comprising:
 a substantially vertical web having a bottom end and a top end;
 a top flange extending from the top end of the web, wherein the top flange has a substantially horizontal upper surface forming a portion of the substantially planar upper surface; and
 a bottom flange extending from the bottom end of the web, wherein the bottom flange has a substantially horizontal lower surface forming a portion of the bottom surface, wherein the top flanges of the x and y direction beams comprise a plurality of spaced apart apertures and the platen comprises a plurality of spaced apart apertures that align with the spaced apart apertures in the top flanges, wherein a securing mechanism is position through each of the aligned apertures to secure the top plate to the grid of beams lower surfaces of the beam.

13. The 3D printer of claim 11, where the securing mechanism comprises rivets, screws, spring, magnets and welds.

14. The 3D printer of claim 1 and further comprising a bottom plate secured to the bottom surface of the grid assembly.

15. The 3D printer of claim 1, wherein the platen is one or more of a vacuum platen configured to be in communication with a vacuum source to selectively hold down a sheet substrate or a magnetic platen configured to hold down a metallic substrate.

16. The 3D printer of claim 1, wherein a weight of the platen assembly is less than 60 pounds.

17. The 3D printer of claim 1, wherein the build surface of the platen has a build surface area of at least 400 square inches and maintains its flatness to within a flatness tolerance of 0.020 inches over a temperature range of at least 20C-150C.

18. A 3D printer comprising:
 a heated build chamber comprising opposing side walls, each opposing side wall having a plurality of spaced apart slots; and
 a platen assembly within the chamber, the platen assembly comprising:
  a grid assembly comprising at least six independent beams forming at least a 4 ×2 framework of interlocked perpendicular x direction beams and y direction beams, providing a substantially planar upper surface and a lower surface
   wherein the grid assembly comprises:
    an interior grid comprising at least two x direction beams interconnected with at least two y direction beams; and
    an exterior frame comprising exterior beams that at least partially surrounding the interior, wherein the exterior frame surrounds the interior grid; and
  a platen comprising a metal sheet supported on the upper surface of the grid assembly and secured to the grid assembly such that the upper surface provides a substantially flat build surface;
  an exterior frame comprising exterior beams that at least partially surrounding the interior grid; and
  a bottom plate secured to the bottom surface of the grid assembly;
 wherein the x direction beams, the y direction beams, the platen, the exterior frame and the bottom plate are constructed of substantially a same material having substantially a-same thermal expansion properties; and
 wherein the build surface of the platen has a build surface area of at least 400 square inches and maintains its flatness to within a flatness tolerance of 0.020 inches over a temperature range of at least 20C-300C.

* * * * *